US006900732B2

(12) United States Patent
Richards

(10) Patent No.: US 6,900,732 B2
(45) Date of Patent: May 31, 2005

(54) SYSTEM AND METHOD FOR MONITORING ASSETS, OBJECTS, PEOPLE AND ANIMALS UTILIZING IMPULSE RADIO

(75) Inventor: James L. Richards, Fayetteville, TN (US)

(73) Assignee: Time Domain Corp., Huntsville, AL (US)

( * ) Notice: Subject to any disclaimer, the term of this patent is extended or adjusted under 35 U.S.C. 154(b) by 13 days.

(21) Appl. No.: 10/286,552

(22) Filed: Nov. 1, 2002

(65) Prior Publication Data

US 2003/0052776 A1 Mar. 20, 2003

Related U.S. Application Data

(63) Continuation of application No. 09/456,410, filed on Dec. 8, 1999, now Pat. No. 6,492,904, which is a continuation-in-part of application No. 09/407,106, filed on Sep. 27, 1999, now Pat. No. 6,512,455.

(51) Int. Cl.[7] .............................................. G08B 23/00
(52) U.S. Cl. ............................ 340/573.1; 340/573.3; 340/572.2; 340/572.4; 340/539.13
(58) Field of Search ...................... 340/539.21, 552, 340/554, 568.1, 568.5, 568.6, 571, 572.1, 272.2, 572.4, 573.1, 573.3, 573.4, 991, 539.13; 342/21, 28, 33, 387; 375/295, 259, 130; 600/316, 317, 595, 534, 459

(56) References Cited

U.S. PATENT DOCUMENTS

| | | | | |
|---|---|---|---|---|
| 3,934,252 A | * | 1/1976 | Ross et al. ..................... 342/21 |
| 4,935,918 A | * | 6/1990 | Hicks .......................... 398/75 |
| 5,448,221 A | * | 9/1995 | Weller .................... 340/539.21 |
| 5,521,887 A | * | 5/1996 | Loomis ......................... 368/47 |
| 5,526,357 A | * | 6/1996 | Jandrell ...................... 340/991 |
| 5,677,927 A | * | 10/1997 | Fullerton et al. ........... 375/130 |
| 5,920,278 A | | 7/1999 | Tyler et al. .................. 342/33 |
| 6,026,125 A | * | 2/2000 | Larrick, Jr. et al. ......... 375/295 |
| 6,208,248 B1 | * | 3/2001 | Ross .......................... 340/552 |
| 6,472,976 B1 | * | 10/2002 | Wohl ....................... 340/10.41 |

FOREIGN PATENT DOCUMENTS

DE 197 55 237 A1 7/1999 ........... G04C/11/02

OTHER PUBLICATIONS

International Search Report for Pct Appl. No. PCT/US99/27925, 3 pages, mailed Jun. 14, 2000.

* cited by examiner

*Primary Examiner*—Van T. Trieu
(74) *Attorney, Agent, or Firm*—James S. Finn; William J. Tucker

(57) ABSTRACT

An asset, object, person or animal monitoring system and associated method for monitoring assets, objects, people or animals utilizing impulse radio techniques. The asset, object, person or animal monitoring system of the present invention can vary the duty cycles of the impulse radio transmitters, by both manual and automatic means, to adapt to varied requirements.

18 Claims, 23 Drawing Sheets

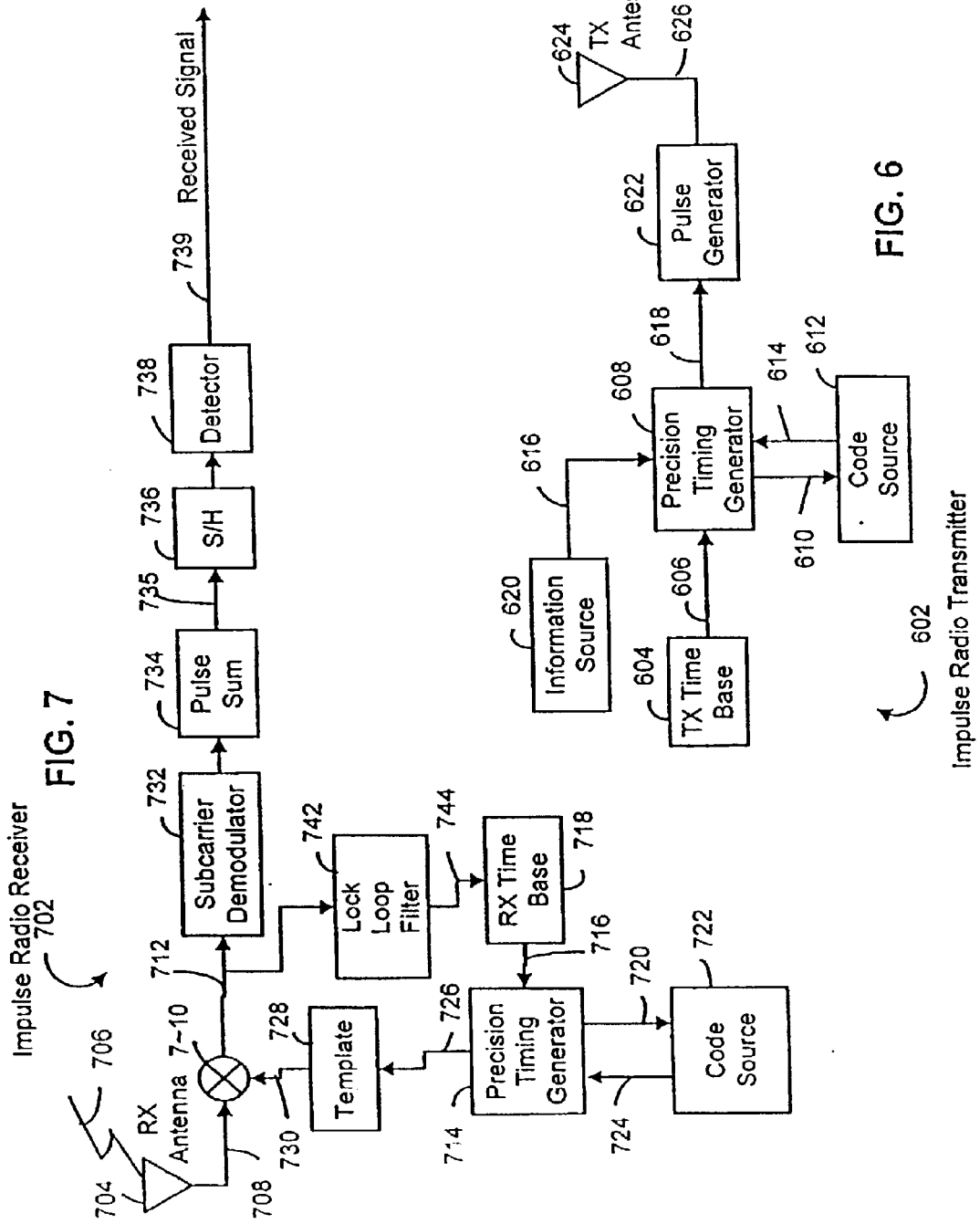

CORRESPONDING TO EACH Δt

Pulse separation showing full multipath separation - the second pulse starts after the multipath completely dies out.

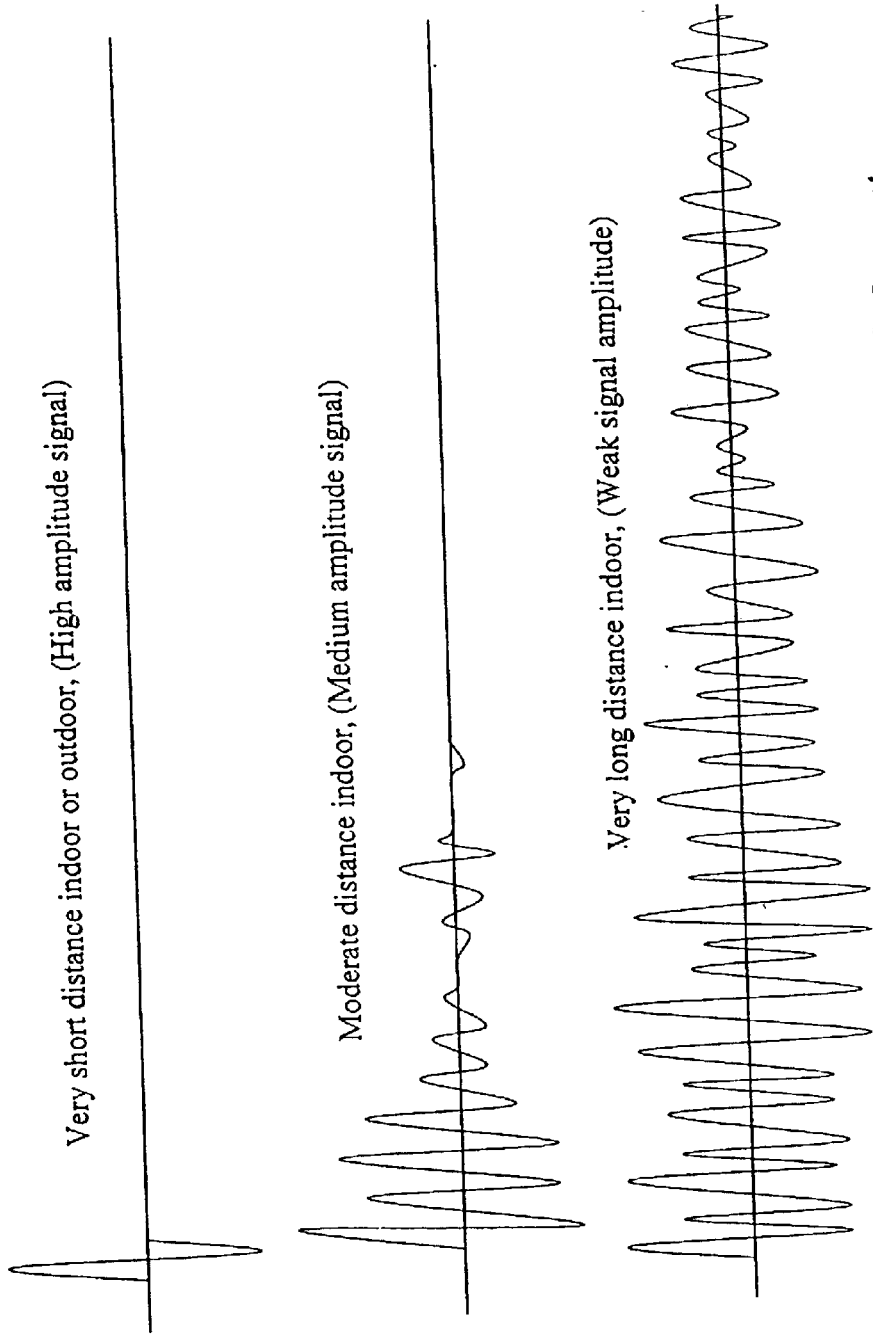

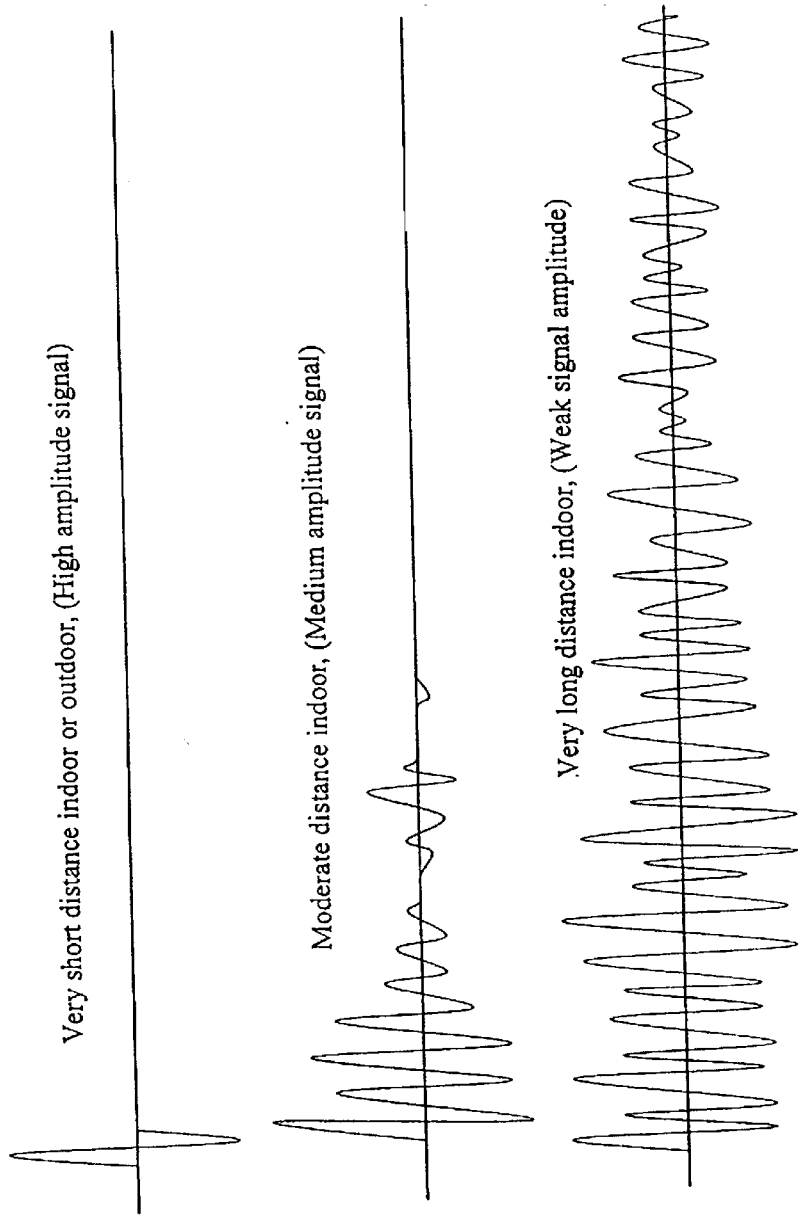

SYSTEM AND METHOD FOR MONITORING ASSETS, OBJECTS, PEOPLE AND ANIMALS UTILIZING IMPULSE RADIO

CROSS-REFERENCE TO RELATED APPLICATIONS

This application is a continuation of U.S. Non-Provisional Application Ser. No. 09/456,410 filed on Dec. 08, 1999 now U.S. Pat. No. 6,492,904, which is a continuation-in-part of U.S. application Ser. No. 09/407,106 filed on Sep. 27, 1999 now U.S. Pat. No. 6,512,455.

BACKGROUND OF THE INVENTION

1. Field of the Invention

The present invention relates generally to monitoring systems for monitoring assets, objects, people and animals and associated methods and, more particularly, to asset, object, people and animal monitoring systems and associated methods for monitoring the location and/or status of assets, objects, people and animals.

2. Related Art

Monitoring the status and location of assets, objects, people or animals is a vital part of everyday life. Improving the methodologies for doing this improves in countless ways the lives of everyone. Because of the large number of variables involved with monitoring assets, objects, people or animals, the background of one example embodiment will be described in detail.

Each day, large quantities of freight which has a cumulative value of many millions of dollars are shipped throughout the United States and throughout the world. For example, large quantities of freight are loaded into rail cars and shipped by railroad. Likewise, large quantities of freight are stored in shipping structures and shipped by ship or barge. Even larger quantities of freight are commonly loaded into trailers and shipped by truck.

Due to the quantity and the value of the freight, the owner of the freight as well as the shipper who has assumed custodial responsibility for the freight would like to monitor the position or location of the freight, regardless of its mode of transportation. Moreover, the owner of the freight as well as the shipper would often times also like to monitor the status of the freight while the freight is in route. Monitoring the status of the entire structure in which the freight lies is well known in the art and is described in U.S. Pat. No. 5,917,433 entitled Asset Monitoring System and Associated Method. That patent enables, for example, monitoring the temperature of a refrigerated trailer in transport to insure that the refrigerated products stored within the trailer are appropriately chilled. However, due to power limitations of the current state of the art as well as multipath problems of having a plurality of radio transmitters transmitting within a structure, the ability to monitor individual objects within a structure has been unachieved.

The earliest method of monitoring the progress of a tractor-trailer required the driver to periodically park the tractor and inspect the contents of the trailer and to telephone the central station or dispatcher in order to report the present location of the tractor-trailer and to obtain updated delivery information and status of the cargo. By requiring the driver to periodically telephone the central station or dispatcher, however, the average speed of the tractor-trailer was significantly reduced. In addition, the information relating to the present location of the tractor-trailer provided by the drivers was sometimes inaccurate, due either to inadvertent mistakes or attempts by the driver to intentionally mislead the dispatcher regarding the progress of the tractor-trailer.

As a result, more sophisticated monitoring systems have been developed which allow communications to be established between the driver of a tractor and a central station or dispatcher, while the tractor-trailer continues along its route. These monitoring systems can also include a receiver mounted to the tractor for communicating with the Global Positioning System (GPS) satellites in order to determine the present location of the tractor-trailer. The monitoring systems can then transmit information relating to the present position of the tractor-trailer to the central station or dispatcher without requiring the driver to stop the tractor-trailer and to telephone the central station or dispatcher.

Conventional monitoring systems can also include one or more sensors for monitoring predetermined engine parameters, such as the oil pressure or engine temperature. Data representing these parameters can then be transmitted to the central station or dispatcher on an event-triggered, i.e., emergency basis, on a regularly scheduled basis or as requested or polled. In addition, conventional monitoring systems can include one or more sensors mounted within or upon the trailer in order to monitor predetermined conditions within the trailer, such as the temperature within a refrigerated trailer. This is not problematic with conventional radios if a single sensor is monitoring and transmitting information on single criteria, for example temperature. However, if there are a number of different criteria to be monitored on individual cargo items, for the reasons subsequently articulated, conventional wireless transmission are inadequate.

In a like fashion, these tractor-based monitoring systems can then transmit the sensory signals provided by the trailer sensors to the central station or dispatcher. Accordingly, conventional monitoring systems can monitor the location of the tractor, while monitoring a very limited number of predetermined engine or trailer conditions as the tractor-trailer continues along its route.

As has been discussed, a variety of monitoring systems have been developed which are designed to monitor the location and, in some instances, the status of freight during shipment. However, all of these prior systems have in some way relied on conventional radio and communication systems with the concomitant limitations.

For example, conventional radio systems are band and power limited. Further, they are subject to multipath effects and perform poorly in many environments. Because of these aforementioned limitations conventional monitoring systems typically only monitor large structures such as tractor trailers or shipping cargo trailers. Multi-path effects and limited bandwidth prevent placing asset monitoring transmitters within the shipping structures themselves.

The prior system limitations can be exemplified. A tractor trailer may be shipping very valuable cargo across the country and it is desired to monitor the location and status of the cargo. The cargo may be biohazardous material that must be maintained at a certain temperature. With current systems, only the overall temperature and position of the trailer can be ascertained. If an individual canister is removed or if its individual temperature exceeds a predetermined limit, it could not be determined. Consequently, there has been a persistent need in the asset monitoring industry to not only track and monitor the status of a structure as a whole, but also to track and monitor individual assets, objects, people or animals within that structure.

SUMMARY OF THE INVENTION

It is therefore an object of the present invention to provide an asset, object, person or animal monitoring system and associated method for monitoring assets, objects, people or animals utilizing impulse radio techniques.

It is another object of the present invention to provide an impulse radio asset, object, people or animal monitoring system and associated method for monitoring the status of assets, objects, people or animals without the use of external power supplied to the transmitters on the contents of the structure.

It is another object of the present invention to provide an impulse radio asset, object, people or animal monitoring system and associated method for monitoring the status of assets, objects, people or animals wherein the impulse radio transmitters can vary its transmission duty cycles, by both manual and automatic adjustment, to adapt to varied requirements.

These and other objects are provided, according to the present invention, by an asset, object, people or animal monitoring system and associated method which includes an asset, object, people or animal monitor for providing a remotely located central station with information relating to assets, objects, people or animals which may be located in a structure. The assets, objects, people or animal monitor also includes a controller for controlling its operations, an impulse radio receiver in communication with said controller and at least one impulse radio transmitter attached to the assets, objects, people or animals to be monitored and transmitting information to said receiver regarding the status and location of the assets, objects, people or animals.

The asset, object, people or animal monitoring system and, in one embodiment, the asset, object, people or animal monitor, include communications means, such as a communications transceiver, for establishing a first communications link between the asset, object, people or animal monitor and the remotely located central station. The communications means of the asset, object, people or animal monitor is adapted to receive information from the impulse radio receiver and transmit information, such as the location of the structure, the status of the structure, the status of the structure's contents and the effective time and date of the location and status information, to the central station via the first communications link.

The transmitters of one advantageous embodiment of the present invention interface with a sensor that determines various required information about the individual contents of the structure; such as temperature, humidity, physical presence, volume, radio activity or any other required parameters. Each sensor is associated with the individual contents of the structure and is adapted to provide a predetermined type of sensory signal. For example, each sensor can be adapted to provide a respective interrupt signal to the sensor interface, such as in instances in which the sensed condition or event falls outside of an acceptable range. The transmission duty cycle of the transmitters can be manually or automatically modified to accommodate the varying needs of the shipper. For example, if the asset to be monitored will be in a structure for extended periods of time because of storage requirements or long distance traveled, the transmission duty cycle will be minimal (possibly a transmission every hour). This will greatly increase the battery life of the transmitters. If, however, the objects to be monitored require constant monitoring, a very short (e.g., 10-second) transmission duty cycle can be implemented.

Based on the interrupt signals provided by the sensors, transmitted by the transmitters and received by the receivers which are interfaced with the asset, object, people or animal monitor, the asset, object, people or animal monitor can transmit a warning signal to the central station to alert the dispatcher to the sensed condition or event. In addition to, or instead of, providing interrupt signals, the sensors can provide sensory signals that are indicative of the condition or event being monitored. The asset, object, people or animal monitor can then process and/or store these sensory signals and can transmit these sensory signals to the central station, such as in instances in which the asset, object, people or animal monitor determines that the sensory signals fall outside of an acceptable range.

The asset, object, people or animal monitoring system can also include an operator interface that may, for example, be mounted within the cab of a tractor or truck. According to this advantageous embodiment, the communications means can also establish a second communications link between the asset, object, people or animal monitor and the operator interface. Thus, the asset, object, people or animal monitor and the operator or driver can exchange or transmit predetermined types of information. For example, the asset, object, people or animal monitor can provide information relating to the present location of the structure and the status of the structure and its individual contents, such as by providing warning signals to the operator if the sensed conditions or events fall outside of an acceptable range. In addition, the asset, object, people or animal monitor can pass messages between the central station and the operator interface, such as to provide warnings, revised directions or an updated itinerary.

The asset, object, people or animal monitor can also include position-determining means, such as a receiver, for receiving externally supplied location data indicative of the present position of the structure. For example, the position receiver can include a GPS receiver for receiving location data from a plurality of GPS satellites from which the present position of the structure can be determined. Accordingly, the asset, object, people or animal monitor can transmit information identifying the present position of the structure to this central station via the first communications link.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 6 illustrates a representative impulse radio transmitter functional diagram.

FIGS. 17A to 17F relate to a multipath feature and algorithms.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview of the Invention

Figure 1B:
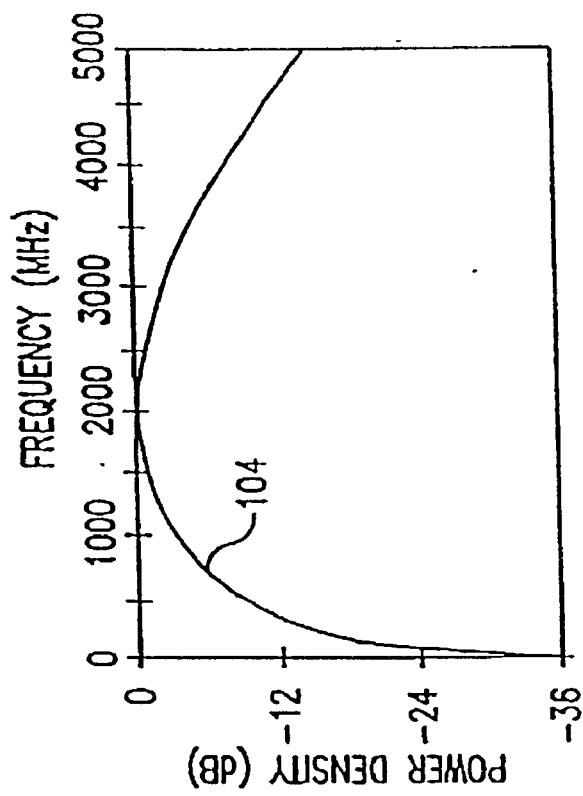
FIG. 1B illustrates the frequency domain amplitude of the Gaussian Monocycle of FIG. 1A.

The present invention relates to monitoring systems and methods for monitoring assets, objects, people and animals and associated methods and, more particularly, to asset, object, people and animal monitoring systems and associated methods for monitoring the location and/or status of assets, objects, people and animals utilizing impulse radio. As used herein in the illustrative embodiment, "structure" includes open or enclosed trailers, rail cars, shipping containers, towed barges, offshore oil or gas rigs, mobile office or home trailers as well as other types of structures known to those skilled in the art. Further, it is anticipated that structure can also include any enclosed area or designated area wherein impulse radio can provide benefits, to include the interior of buildings, such as hospitals, prisons, homes and warehouses and even designated boundary lines in open fields.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout. Recent advances in communications technology have enabled an emerging, revolutionary ultra wideband technology (UWB) called impulse radio communications systems (hereinafter called impulse radio). To better understand the benefits of impulse radio to the present invention, the following review of impulse radio follows Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997), U.S. Pat. No. 5,687,169 (issued Nov. 11, 1997) and co-pending application Ser. No. 08/761,602 (filed Dec. 6, 1996) to Fullerton et al.

Uses of impulse radio systems are described in U.S. Pat. No. 6,177,903, entitled, "System and Method for Intrusion Detection Using a Time Domain Radar Array," and U.S. Pat. No. 6,218,979, entitled, "Wide Area Time Domain Radar Array," both filed on Jun. 14, 1999 and both of which are assigned to the assignee of the present invention. These patent documents are incorporated herein by reference.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

where σ is a time scaling parameter,
t is time,
$f_{mono}(t)$ is the waveform voltage, and
e is the natural logarithm base.

Figure 1A:
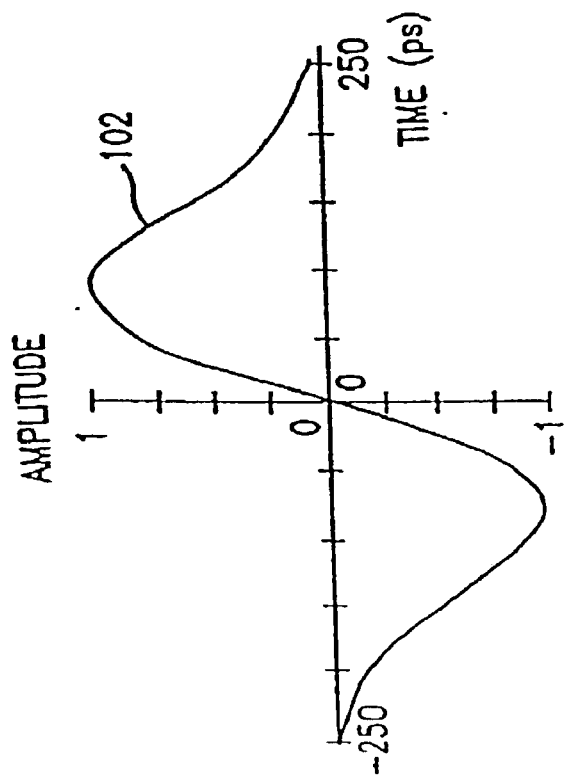
FIG. 1A illustrates a representative Gaussian Monocycle waveform in the time domain.

The frequency domain spectrum of the above waveform is shown in FIG. 1B. The corresponding equation is:

$$f_c = \frac{1}{2\pi\sigma}$$

The center frequency ($f_c$), or frequency of peak spectral density is:

$$F_{mono}(f) = (2\pi)^{\frac{3}{2}}\sigma f e^{-2(\pi\sigma f)^2}$$

These pulses, or burst of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
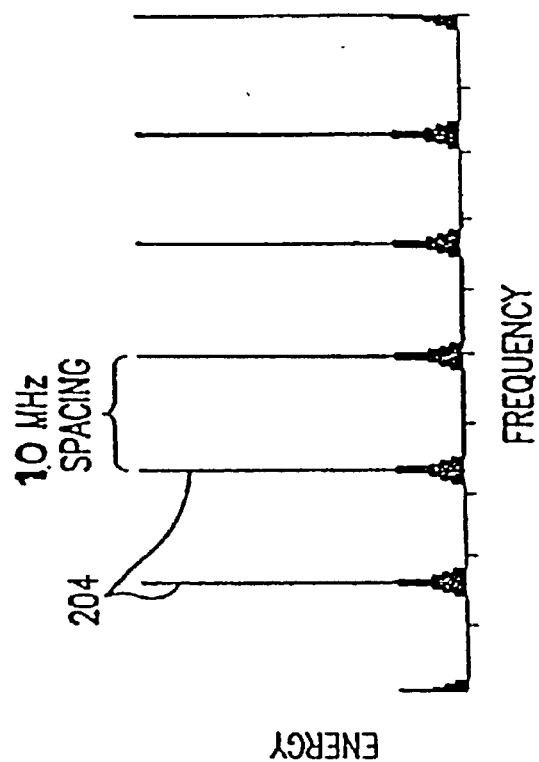
FIG. 2B illustrates the frequency domain amplitude of the waveform of FIG. 2A.
Figure 2A:
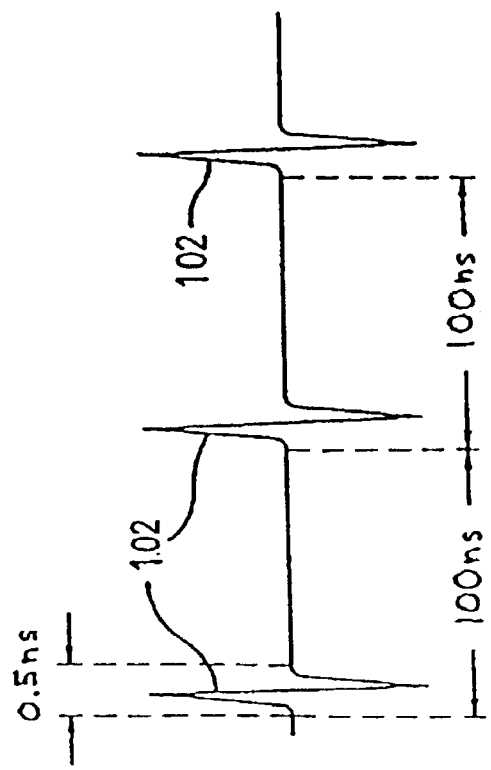
FIG. 2A illustrates a pulse train comprising pulses as in FIG. 1A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band. It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
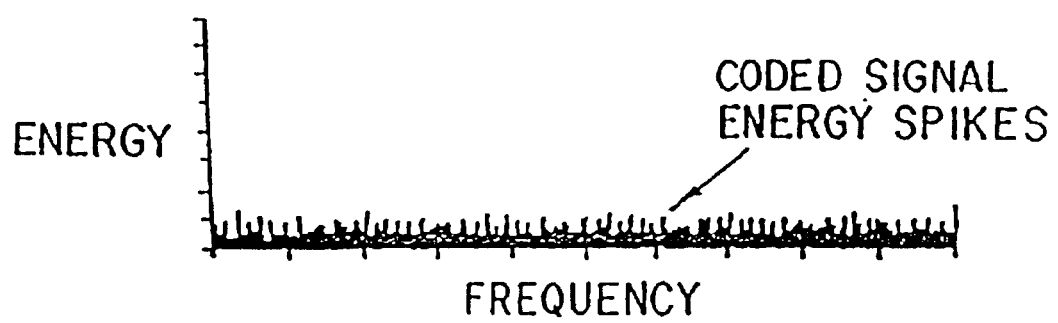
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
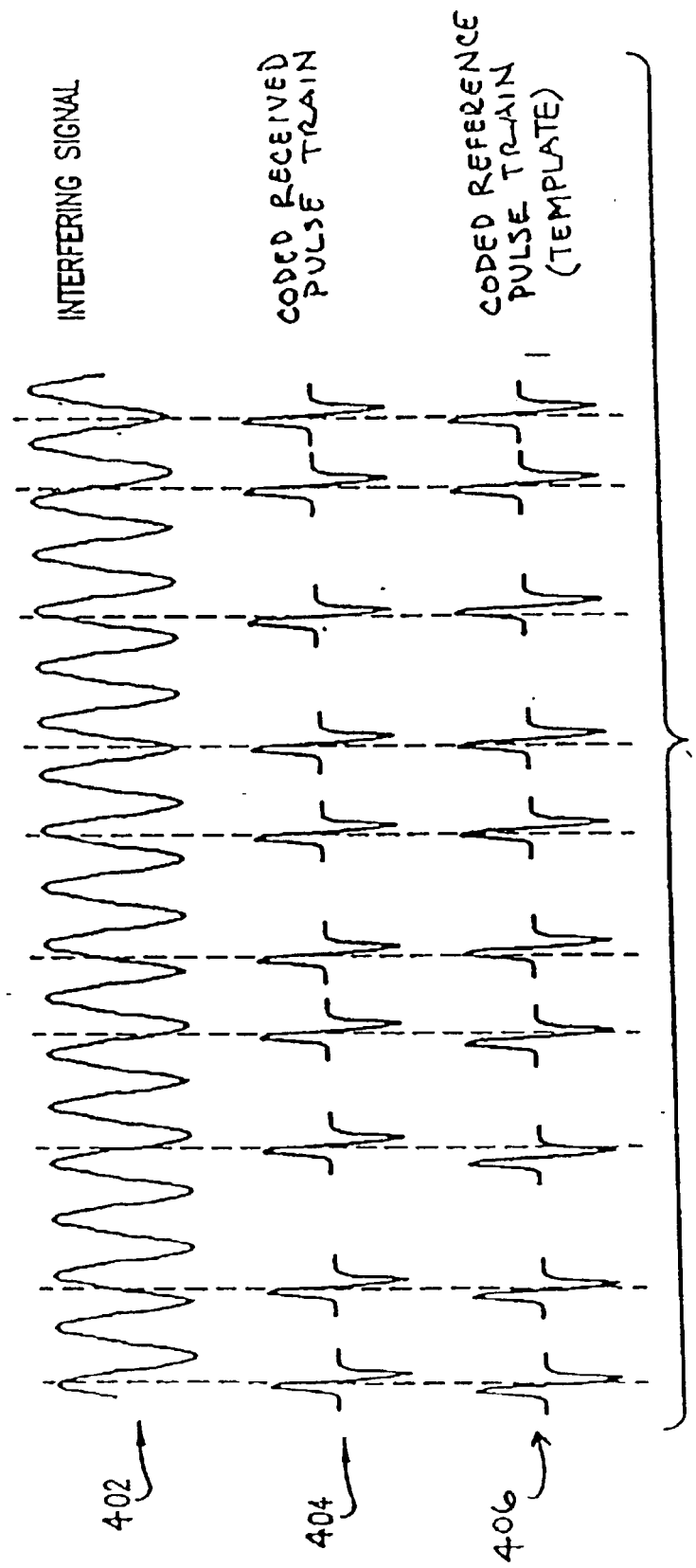
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHZ channel bandwidth yields a processing gain of 1000 or 30 dB. However, far greater processing gains are achieved with impulse radio systems, where for the same 10 KHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^3$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their relative phase. This results in possible summation or possible cancellation, depending on the specific propagation to a given location. This also results in potentially wild signal strength fluctuations in mobile applications, where the mix of multipath signals changes for every few feet of travel.

Impulse radios, however, are substantially resistant to these effects. Impulses arriving from delayed multipath reflections typically arrive outside of the correlation time and thus are ignored. This process is described in detail with reference to FIGS. 5A and 5B. In FIG. 5A, three propagation paths are shown. The direct path is the shortest. It represents the straight line distance between the transmitter and the receiver. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
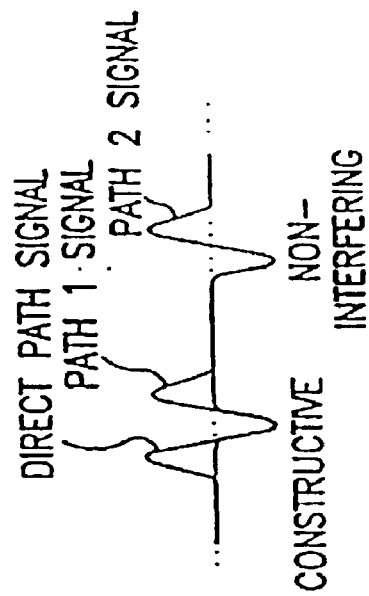
FIG. 5B illustrates exemplary multipath signals in the time domain.
Figure 5A:
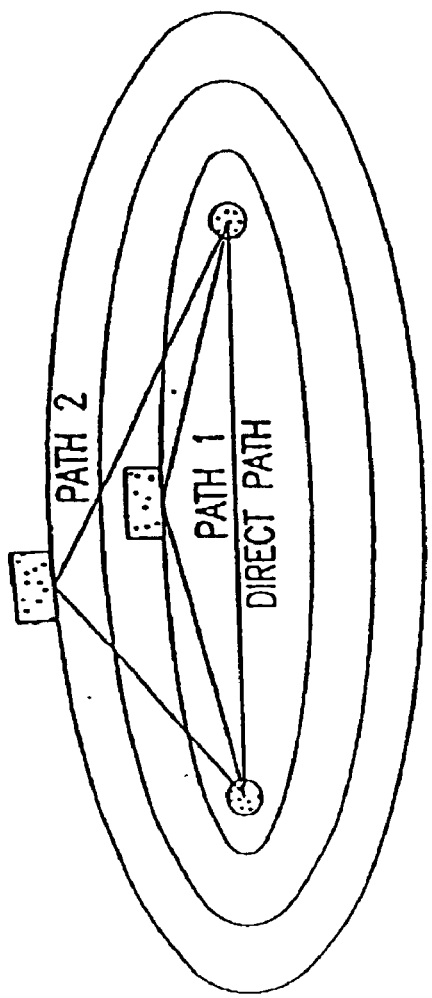
FIG. 5A illustrates a typical geometrical configuration giving rise to multipath received signals.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect. The bulk of the multipath signals, which are substantially delayed, are removed from the correlation process and are ignored.

The multipath signals delayed less than one quarter wave (one quarter wave is about 1.5 inches, or 3.5 cm at 2 GHz center frequency) are the only signals that will attenuate the direct path signal. This is the reflection from the first Fresnel zone, and this property is shared with narrow band signals; however, impulse radio is highly resistant to all other Fresnel zone reflections. The ability to avoid the highly variable attenuation from multipath gives impulse radio significant performance advantages.

Distance Measurement

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending application Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference.

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

Figure 7B:
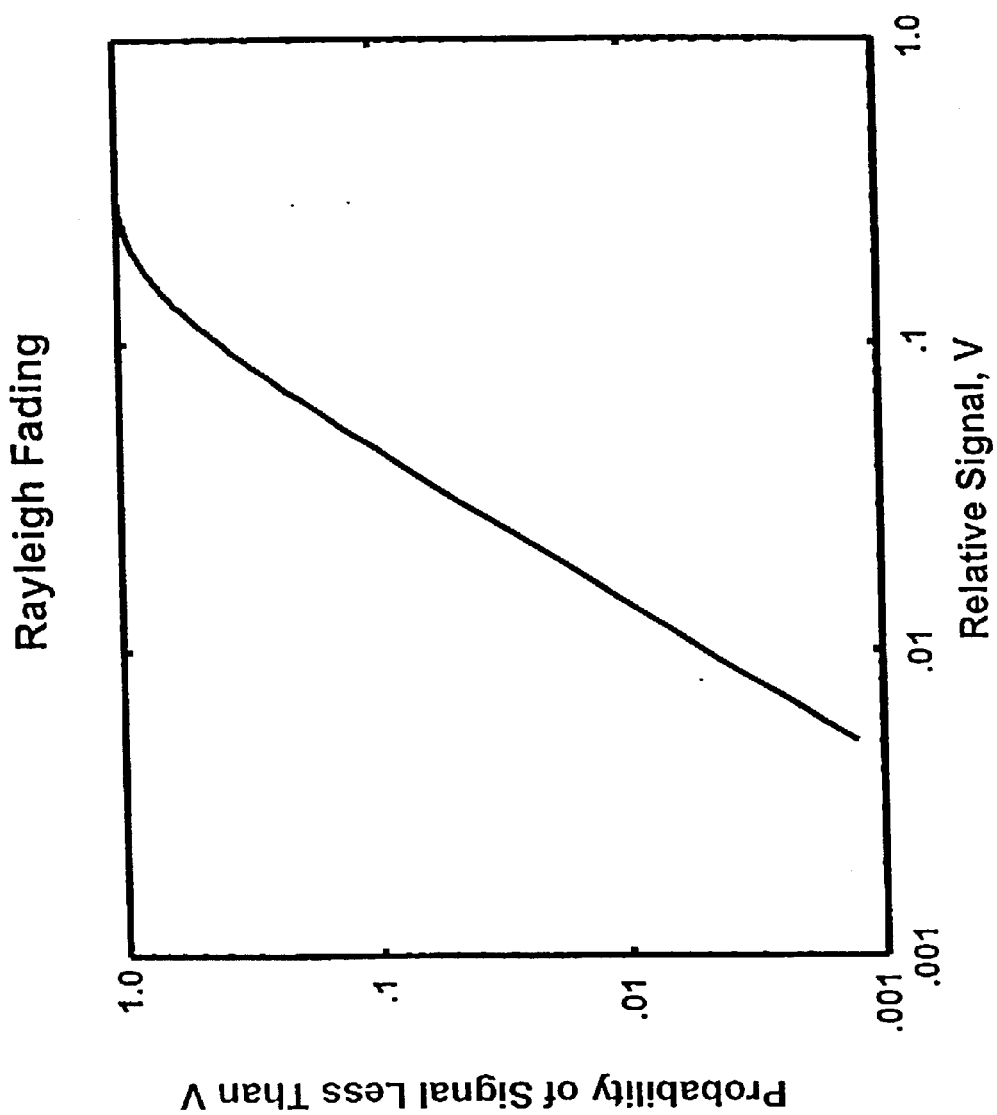
FIG. 7 illustrates a representative impulse radio receiver functional diagram.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
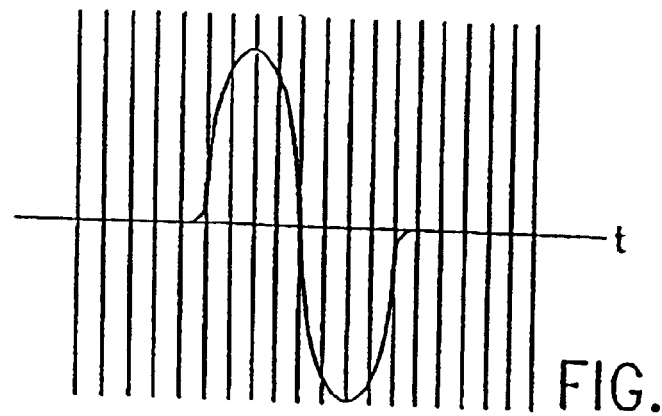
FIG. 8A illustrates a representative received pulse signal at the input to the correlator.
Figure 8B:
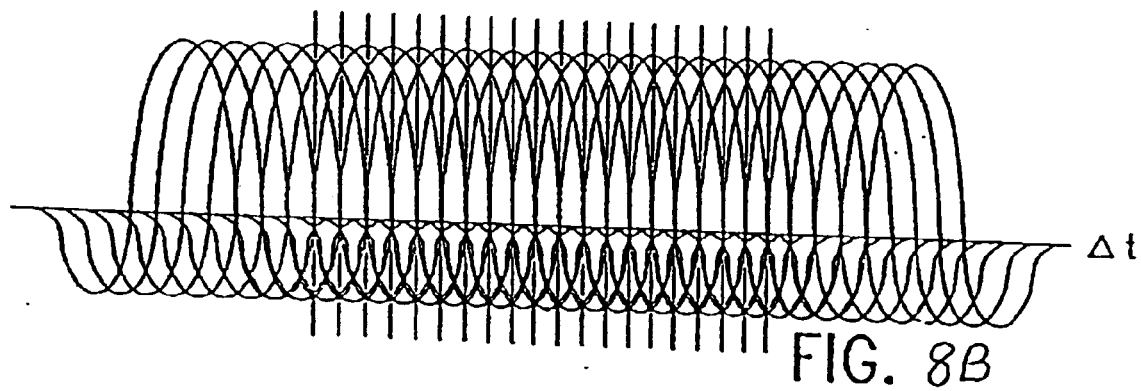
FIG. 8B illustrates a sequence of representative impulse signals in the correlation process.
Figure 9:
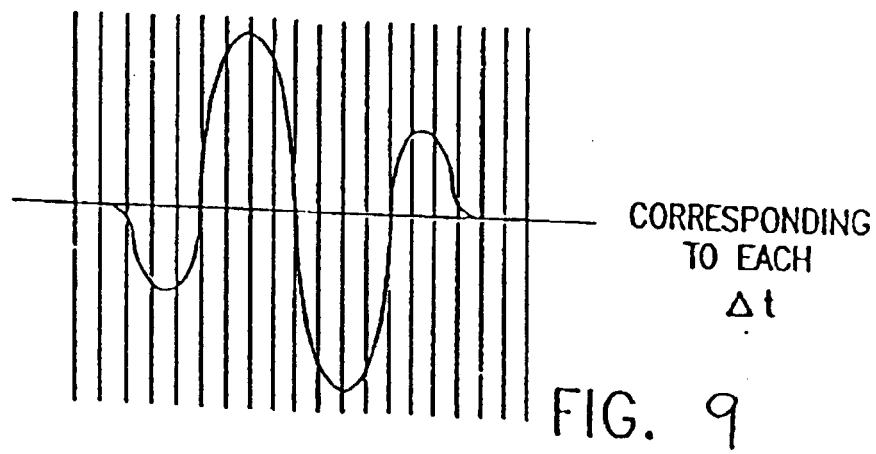
FIG. 9 illustrates the potential locus of results as a function of the various potential template time positions.
Figure 10:
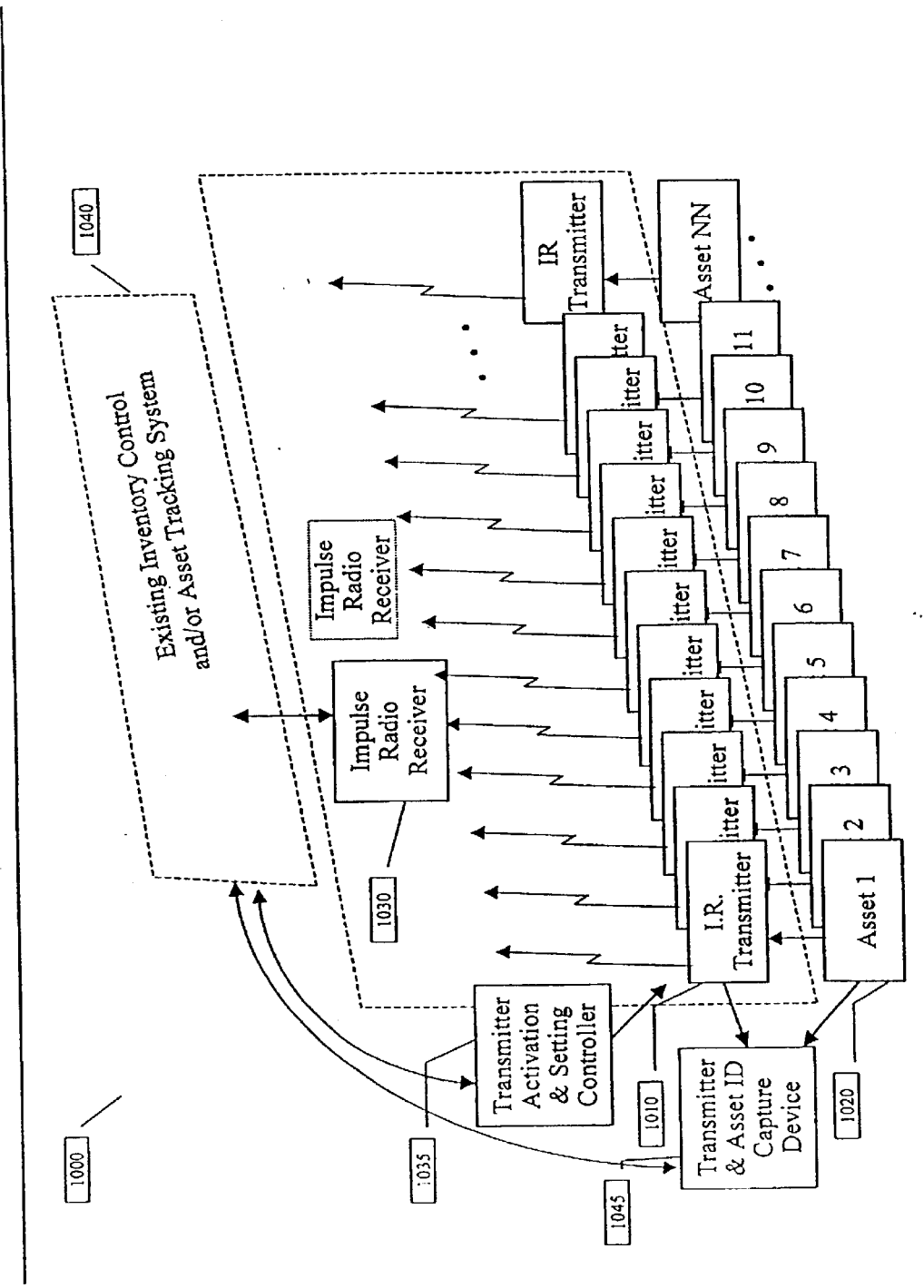
FIG. 10 illustrates an overview of impulse radio technology utilized in asset, object, object, people or animal monitoring systems that can be implemented into any monitoring system.

FIGS. 8–10 illustrate the cross correlation process and the correlation function. FIG. 8 shows the waveform of a template signal. FIG. 8B shows the waveform of a received impulse radio signal at a set of several possible time offsets. FIG. 9 represents the output of the correlator (multiplier and short time integrator) for each of the time offsets of FIG. 8B. Thus, this graph does not show a waveform that is a function of time, but rather a function of time-offset. For any given pulse received, there is only one corresponding point which is applicable on this graph. This is the point corresponding to the time offset of the template signal used to receive that pulse. Further examples and details of precision timing can be found described in U.S. Pat. Nos. 5,677,927 and 6,304,623, both of which are incorporated herein by reference.

Impulse Radio as Used in the Present Invention

As discussed above, when utilized in asset, object, people or animal monitoring of the present invention, the characteristics of impulse radio significantly improve the state of the art. Referring now to FIG. 10, an asset, object, people or animal monitoring system 1000 according to the broad usage is depicted. Due to the unique characteristics of impulse radio technology, the major components of the impulse radio can be complimented with or replace existing monitoring devices and monitor assets, objects, people or animals in areas and ways previously thought impossible. The basic components include an impulse radio transmitter 1010 for transmitting monitored information for, for example, an asset 1020. Impulse radio transmitter 1010 transmits information relating to asset 1020 to impulse radio receiver 1030.

As depicted, a large number of impulse radio receivers and impulse radio transmitters as well as assets to be monitored can be utilized because of the unique properties of impulse radio systems. If automatic activation and duty cycle adjustment are desired for the transmitters, a transmitter activation and setting controller 1035 is added to the system and in communication with impulse radio transmitter 1010. If complicated asset, object, people or animal correlation is desired, a transmitter and asset ID capture device 1045 is further implemented into the system. Integration can be accomplished with other systems, such as existing inventory control systems and/or asset tracking systems 1040.

Figure 11:
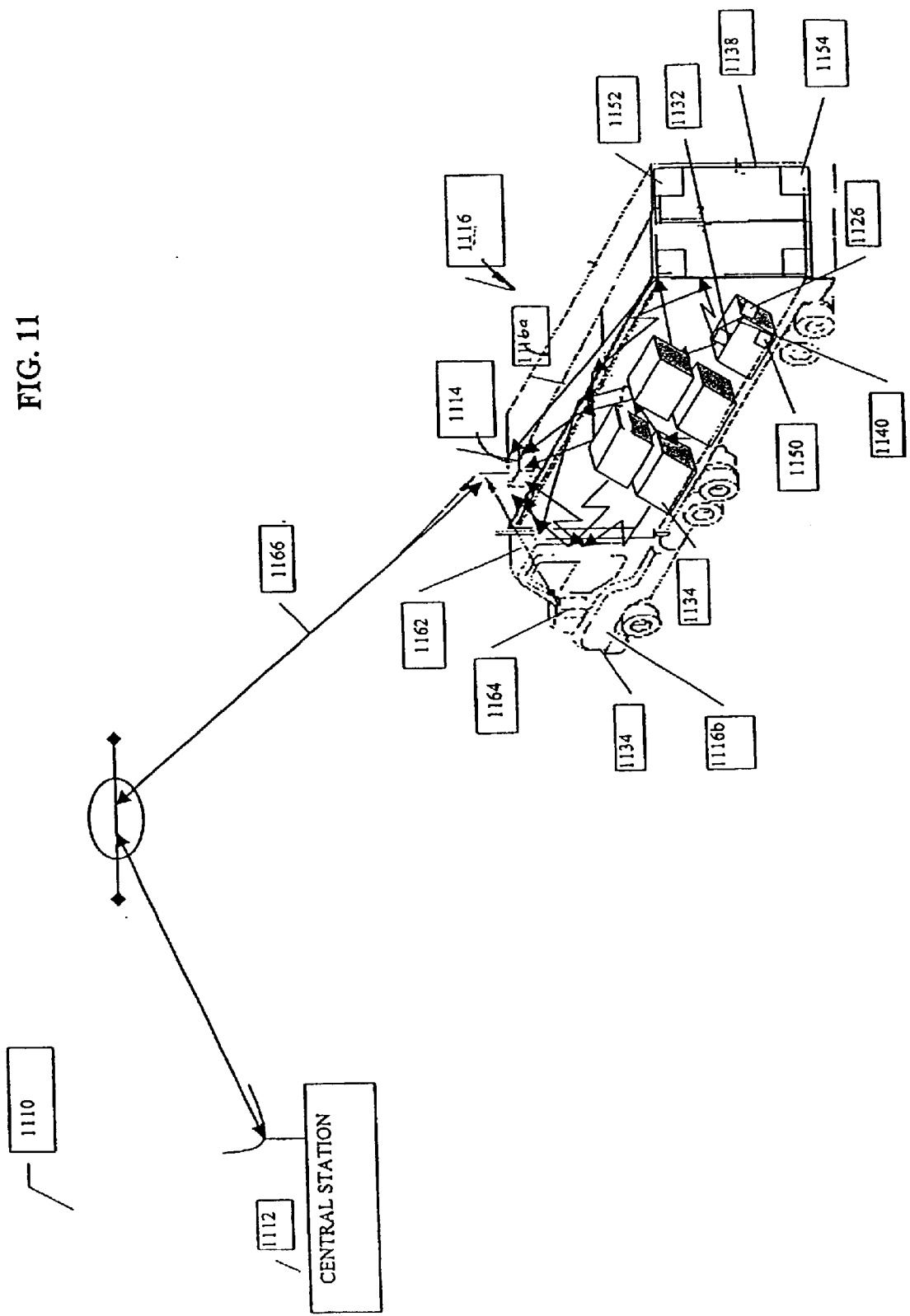
FIG. 11 is a diagrammatic illustration of an asset, object, people or animal monitoring system utilizing impulse radio and used in a truck and trailer embodiment of the present invention.

Referring now to FIG. 11, an asset, object, people or animal monitoring system 1110 according to one embodiment of the present invention is illustrated. The asset, object, people or animal monitoring system 1110 includes a central station 1112 and one or more asset, object, people or animal monitors 1114 associated with respective structure 1116. As illustrated in FIG. 11, for example, the structures can include one or more open or enclosed trailers 1116a which are adapted to be hitched to and towed by respective tractors or trucks 1116b. However, the structures can include other types of structures, both mobile, such as rail cars, shipping structures, towed barges, offshore oil or gas rigs or mobile office or home trailers and immobile, such as storage warehouses, without departing from the spirit and scope of the present invention. By way of example, however, the asset, object, people or animal monitoring system and associated method of the present invention will be described in more detail hereinafter in conjunction with the monitoring and monitoring of trailers, although other types of structures could be effectively monitored and monitored by the asset, object, people or animal monitoring system and method of the present invention.

As the above examples illustrate, the structure 1116 has the potential to be mobile. That is, the structures are able to be moved from place to place. However, the structures are typically not able to move from place to place under their own power. Thus, a structure usually includes a source of electrical power for performing a predetermined function, such as a generator for operating the refrigeration unit of a refrigerated trailer. This power source can be utilized to power the asset, object, people or animal monitor 1114. Further, if the structure is not mobile, immobile storage facilities typically have power supplies connected therewith that can be used to power the asset, object, people or animal monitor 1114.

As shown in FIG. 11, an asset, object, people or animal monitor 1114 is associated with and mounted to a respective structure 1116. Included in and interfaced with the asset, object, people or animal monitor, is an Impulse Radio Receiver 1114a. The asset, object, people or animal monitor 1114 can be mounted to the structure 1116 in a number of manners without departing from the spirit and scope of the present invention. For example, the asset, object, people or animal monitor 1114 of the present invention can be mounted to the exterior of the structure 1116a, as depicted in FIG. 11, within the structure or within the walls of the structure. Although the asset, object, people or animal monitor 1114 can be permanently mounted to the structure, the asset, object, people or animal monitor can also be temporarily mounted to a structure. For example, an asset, object, people or animal monitor can be temporarily mounted to a rental trailer in order to monitor the location and status of the rental trailer and its contents. As also shown in FIG. 11 and as described hereinafter, the asset, object, people or animal monitor is adapted to receive signals from the impulse radio transmitter 1132 and communicate, via a first communications link, with a remotely located central station 1112 so as to provide the central station 1112 with information relating to the structure 1116a and the contents 1134 therein with which the asset, object, people or animal monitor 1114 is associated.

Figure 16:
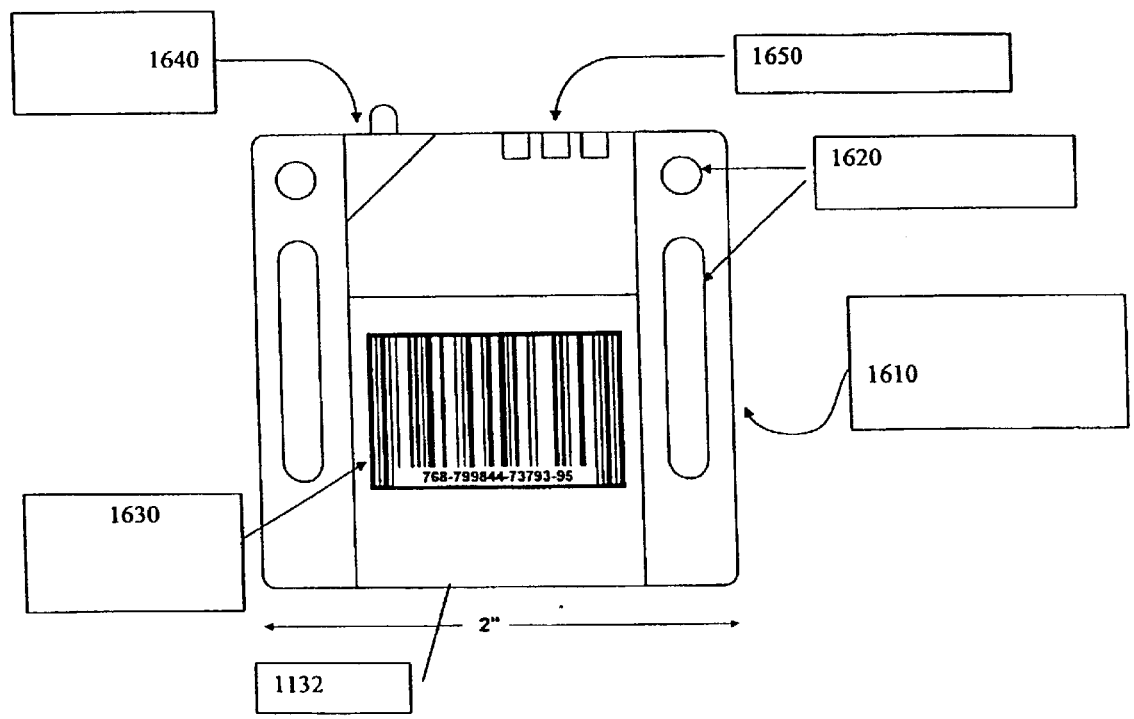
FIG. 16 depicts one possible embodiment of an impulse radio transmitter of the present invention.

An impulse radio transmitter 1132 is secured to some type of cargo 1134. As illustrated in FIG. 16, the impulse radio transmitter can be secured by an adhesive 1610 or via mounting holes 1620. The individual cargo items can be large items such as a refrigerator or a number of smaller items on a pallet or in a crate. Further, sensors 1126 can be attached to the cargo 1134 and interfaced with the transmitters 1132 for transmission to the receiver 1114a. Typically, the sensors 1126 are electrically connected to the impulse radio transmitter 1132 via a sensor interface 1140. For example, an electrical bus, such as an RS485 electrical bus can interconnect each of the sensors and the sensor interface. However, the sensors can be electrically connected to the impulse radio transmitter in a variety of other fashions without departing from the spirit and scope of the present invention. For example, the sensor interface can include an RF, infrared (IR) or audio transceiver for communicating with the sensors via local RF, IR or audio communications links, respectively. Also, the sensor 1126 can be built onto the same circuit board as the impulse radio transmitter, thereby avoiding the need for external interface. The sensors 1126 can be designed to monitor any type of status. For example, if the cargo is temperature critical, the sensor can monitor the temperature of the cargo 1134, pass that information to the impulse radio transmitter 1132, which transmits that information to the impulse radio receiver 1114a for forwarding to the asset, object, people or animal monitor 1114.

In order to conserve impulse radio transmitter 1132 power, it is very important that the transmitters be designed such that it is possible to begin transmission once they are loaded into the structure 1116 or at least at a prearranged time shortly there before. It is well know in the wireless art to be able to remotely activate devices. The wireless switch activation device can be designed to turn on the impulse radio transmitter when it comes within a certain range (i.e., within the perimeter of the entrance 1138 of the structure 1116a). This design will vary with the size of the entrance to the structure, but the activation distance will be small enough so as not to inadvertently initiate the impulse transmitters. When the cargo 1134 and impulse radio transmitter 1132 attached thereto pass through the entrance 1138 to the structure, they come within range of the wireless switch activation device 1152 and begin impulse radio transmissions.

It is understood that other methods of impulse radio transmitter activation can be accomplished. For example, the individual loading the device can manually activate the transmitter, or they can be activated when initially attached to the cargo by any method desired.

If a sensor is being utilized, they can also be activated remotely by the switch activation device upon placement in the structure. In order for the information provided by the sensor to be important and useful, there must be a way to correlate the information regarding which transmitter is on which particular piece of cargo.

When transmitting information, each impulse radio transmitter 1132 transmits identifying information. This information can be a serial number. Further, provided at the entrance to the structure is a bar code scanning device 1154. Typically, cargo inventory 1134 is maintained in a database with a given inventory control number. Further, each impulse radio transmitter has a given serial number. One useful embodiment of the present invention is for the serial number to be imbedded in a barcode 1630 on impulse radio transmitter 1132 and for the cargo inventory control number to be imbedded in a bar code 1150 on cargo 1134. When the cargo with the impulse radio transmitter 1132 passes through the perimeter to the entrance 1138 of the structure 1116a, a bar code scanning device 1154 reads the bar code 1150 of both the impulse radio transmitter 1132 and the cargo 1134 and passes that information to the asset, object, people or animal monitor 1114.

Figure 12:
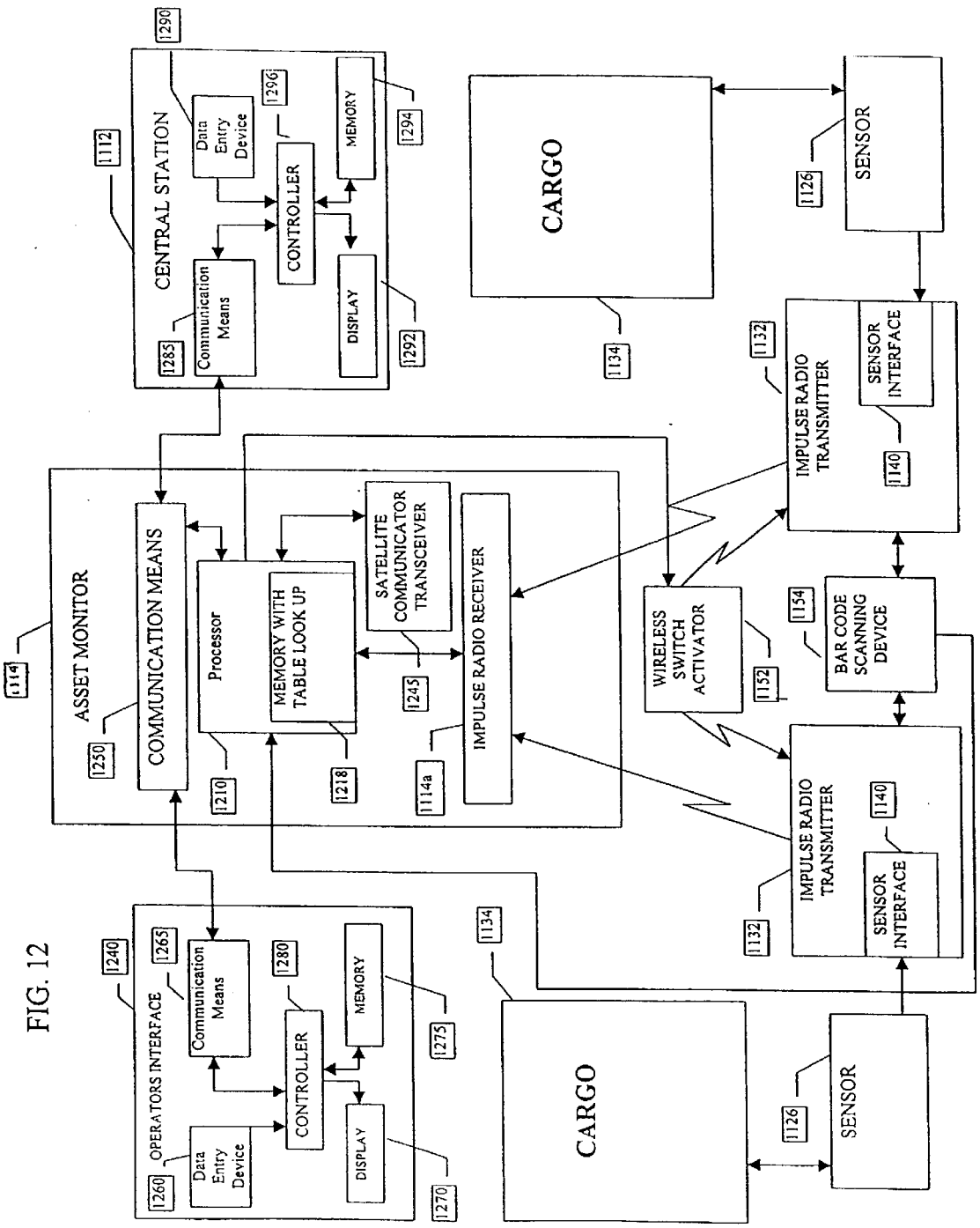
FIG. 12 is a block diagram representation of an asset, object, people or animal monitoring systems according to one embodiment of the present invention which illustrates the asset, object, people or animal monitor and components therein, the operator's interface and the components therein, the asset being monitored, sensors, a wireless switch activator, a bar code scanning device, an impulse radio transmitter and the central station with components therein.

As depicted in FIG. 12, the asset, object, people or animal monitor 1114 contains in memory 1218 a database of all potential inventory control numbers for both the impulse radio transmitters 1132 and the cargo 1134. A match is then made so that it can be determined which impulse radio transmitter 1132 is associated with which piece of cargo 1134.

It is illustrative to exemplify the process. Assume you are shipping a plurality of different biohazardous materials. Assume for this example, that cargo 1134 is this biohazardous material. Each refrigerated cargo 1134 must be maintained at a different temperature and humidity level so as to keep the hazardous material safe. Each refrigerated cargo 1134 is given an inventory control number and has a sensor 1126 for monitoring temperature and humidity. At some point prior to shipping, a non-activated and therefore non-transmitting impulse radio transmitter 1132, which also possesses a unique serial number, is physically attached to the refrigerated cargo 1134 and interfaced with the sensor 1126 by, for example, a RS 232 serial cable. When the refrigerated cargo is loaded onto the structure for shipping, it passes through the entrance 1138 to the structure 1116a. In the entrance to the structure, the switch activating means 1152 wirelessly activates the impulse radio transmitter 1132 and the bar code scanner 1154 continuously scans to read the bar codes of both the impulse radio transmitter 1132 and the cargo 1134.

The information relating to which cargo 1134 and impulse radio transmitter 1132 are being passed through the entrance to the structure is forwarded to the asset, object, people or animal monitor 1114. Located in memory 1218 in the asset, object, people or animal monitor 1114 is a table look-up which correlates which impulse radio transmitter 1132 is attached to which cargo 1134. Therefore, when the information is received by the receiver 1114a, which was transmitted by the impulse radio transmitter 1132, which is interfaced with the sensor 1126 attached and sensing parameters on the cargo, the information can be passed to the central station 1112 as well as the driver. If a plurality of cargo 1134 are loaded into the structure 1116a with different monitoring requirements, the base station can usefully determine corrective action on a cargo 1134 by cargo 1134 basis.

Another important aspect of the present invention is its ability to vary the duty cycle and therefore the battery life of the impulse radio transmitter 1132 based on the requirements of the user. This flexibility will determine the parameters of transportation. Methods of varying the duty cycle of impulse radio transmitters have been articulated in detail in the above referenced Impulse Radio patents and, again, is incorporated herein by reference. If the cargo being shipped is, for example, several crates of Ebola virus, it is imperative to know at all times the parameters of the crate; such as temperature, humidity and structural integrity (i.e., is it leaking). In this case, the duty cycle could be an impulse transmission every 5 seconds for continuous update. The increased duty cycle would shorten the battery life of the impulse radio transmitter 1132 and increase the bit rate, thereby decreasing the number of crates 1134 that can be individually monitored; but would be worth the trade off for continual monitoring.

If you were planning to ship 500 crates of chocolate bars across the country, the primary concern would be temperature and presence. Therefore, the duty cycle may be a transmission every few hours, because of the limited damage if a parameter is exceeded (i.e., a chocolate bar melts). Because of the limited duty cycle, the battery life could be extended significantly to a few weeks or longer and the number of crates that can be included is large.

The duty cycle can be varied by many methods. The impulse radio transmitters 1132 can be manufactured so they can be adjusted by a manual method or by the same wireless method used to turn them on. Again, the methods of adjusting the duty cycle are enabled in the aforementioned Impulse Radio patents and the ability to automatically adjust them via a wireless activation device is well known in the art. So as the cargo 1134 passes through the entrance 1138 of the structure 1116a, its bar code 1150 is scanned by the bar code scanner 1154 located at the periphery to the structure 1116a entrance. The bar cod scanner 1154 communicates with the asset, object, people or animal monitor 1114 which determines via its database stored in its memory 1218 that that the crate contains toxic material that must be continually monitored. The asset, object, people or animal monitor 1114 communicates with the wireless switch activating means 1152 via an interface with the wireless switch activating means 1152, and the duty cycle is set to every five seconds.

The next crate may contain rubber mallets for which the only information required is that the crate is still there; and we only need to make that determination every five hours. The same process as described above can set the impulse radio transmitter duty cycle to five hours.

Another factor to consider is the amount of information and the date rate of information that is to be transferred. In the case of the Ebola virus, the desire to monitor 100 parameters may be present. The impulse radio receiver 1114a must know the amount and rate of the data to be transmitted from the impulse radio transmitter 1132. As the bar code 1150 from the cargo 1134 and the bar code 1630 from the impulse radio transmitter 1132 therewith being loaded are scanned, the scanner communicates with the asset, object, people or animal monitor and informs the asset, object, people or animal monitor of the inventory control number of the crate and the serial number of the impulse radio transmitter. The asset, object, people or animal monitor 1114, from its memory, determines the amount of information required from that crate and therefore the data rate transmitted from the impulse radio transmitter 1132. This information is communicated from the asset, object, people or animal monitor 1114 to the impulse radio receiver 1114a and to the wireless switch activating means 1235. The wireless switch activating means 1152 then activates the impulse radio transmitter 1132 to transmit at a given data rate. Thus, the impulse radio transmitter and impulse radio receiver are in sync regarding data rates. Modifying the amount of pulses integrated to obtain a data bit varies the data rate. This is fully discussed in the above referenced patents and is incorporated herein by reference. Further, the ability for a wireless switch activating means 1152 to adjust the data rate of the impulse radio transmitter 1132 is well known and can be fully implemented by an individual skilled in the art.

The sensors 1126 of one advantageous embodiment are designed to provide interrupt signals to the impulse radio transmitters 1132 and thereafter transmitted to the impulse radio receiver 1114a and interfaced with the asset, object, people or animal monitor 1114 upon the detection of a predetermined event. For example, the sensors 1126 can be designed to compare the sensed condition to a predetermined range of acceptable conditions. If the sensor 1126 of this advantageous embodiment detects that the sensed condition inside a crate or inside the structure in general, exceeds or falls outside of the predetermined range of acceptable conditions, the sensor communicates with the impulse radio transmitter 1132, which transmits to the impulse radio receiver 1114a which is in communication with the asset, object, people or animal monitor 1114, thereby notifying it that a sensed condition is no longer within acceptable limits. For example, the temperature sensor can compare the sensed temperature to the predetermined range of acceptable temperatures and, if the sensed temperature falls outside of the predetermined range of acceptable temperatures, can generate an interrupt signal. The range of acceptable conditions can be selected or set in a variety of manners without departing from the spirit and scope of the present invention. For example, the range of acceptable conditions can be downloaded from the central station 1112 to the asset, object, people or animal monitor while the asset, object, people or animal monitor is in the field, such as via the first communications link as described hereinafter.

According to one advantageous embodiment, the asset, object, people or animal monitor 1114 includes a position determining means, typically including a transceiver which is operably connected to the asset, object, people or animal monitor 1114. The position determining means determines the position of the structure 1116, based upon externally supplied location data. According to one advantageous embodiment, the position determining means includes a OPS receiver, such as GPS receiver model number 24080-61 manufactured by Trimble Navigation Limited for receiving signals from a plurality of GPS satellites. Alternatively, the position determining means can include a receiver that is adapted to communicate with one or more LORAN land-based transmitters. Still further, the position determining means can be responsive to location data entered or provided by the operator. Based upon the externally supplied location data, the position determining means can determine the current position of the trailer and can report the current position to the asset, object, people or animal monitor.

The asset, object, people or animal monitoring system 1110 of the present invention also includes communications means for establishing a first communications link between each respective asset, object, people or animal monitor 1114 and the remotely located central station 1112. The communications link supports bidirectional communications and can either be a direct link or can be comprised of a chain of communications links which are linked to create the resulting first communications link. Once the communications means has established the first communications link between the central station 1112 and an asset, object, people or animal monitor 1114a, the respective asset, object, people or animal monitor can transmit information related to the location of the trailer 1116a and information relating to the sensory signals for each individual cargo 1134 within the structure 1116a Based upon the information provided via the first communications link the central station 1112 can monitor the position of the trailer 1116a and status of the trailer 1116a and its cargo 1134. Although not illustrated, the communications means can also establish another communications link between the asset, object, people or animal monitor 1114 and an emergency services dispatcher, such as a "911" dispatcher, in the vicinity of the asset, object, people or animal monitor. Accordingly, the asset, object, people or animal monitor can transmit information via this other communications link to the emergency services dispatcher if an emergency occurs. For example, an asset, object, people or animal monitor can transmit information to the emergency services dispatcher via this other communications link if the sensor attached to hazardous material detects a difficulty in the hazardous material being shipped. The emergency services dispatcher can then quickly dispatch assistance to the operator or driver. In addition to or instead of notifying an emergency services dispatcher of the emergency conditions, the asset, object, people or animal monitor can notify the operator or driver of the emergency conditions, such as via a second communications 1162 link established between the asset, object, people or animal monitor 1114 and an operator interface 1164 as described hereinbelow In one advantageous embodiment, a single tractor 1116b may tow a number of trailers 1116a, such as two or three trailers. Or, in an alternate embodiment, one or more warehouses can be communicatively linked. While each trailer can include its own impulse transmitters and receivers and asset, object, people or animal monitors which independently communicates, via distinct communications links, with the central station 1112, the asset, object, people or animal monitoring system 1110 of this advantageous embodiment can include a master asset, object, people or animal monitor mounted within one of the trailers, such as the trailer directly tethered to the tractor, and one or more slave asset, object, people or animal monitors mounted within respective ones of the other trailers. According to this advantageous embodiment, the slave asset, object, people or animal monitors can each include communications means, such as a local RF transceiver or an impulse radio transceiver, for communicating with the master asset, object, people or animal monitor and for providing the master asset, object, people or animal monitor with information relating to the sensory signals collected from the sensors on-board the respective trailers.

The master asset, object, people or animal monitor can thereafter establish a first communications link with the central station and can provide the central station with information related to the sensory signals collected by each of the asset, object, people or animal monitors, namely, the master asset, object, people or animal monitor and each of the slave asset, object, people or animal monitors. In addition, since all of the trailers will be at the same location, only the master asset, object, people or animal monitor must generally include position determining means. Thus, the cost and complexity of the slave asset, object, people or animal monitors can be reduced relative to the master asset, object, people or animal monitor.

The communications means can utilize various types of communications technology, such as satellite, RF, soft radio, cellular or packet radio communications technology, to establish the first communications link without departing from the spirit and scope of the present invention. For example, the asset, object, people or animal monitor 1114 and the central station 1112 can each include a transmitter and a receiver, hereinafter termed a transceiver, for transmitting data via a terrestrial digital data network, such as via a RAM Mobile communications link established between the asset, object, people or animal monitor and the central station. Alternatively, the asset, object, people or animal monitor and the central station can each include a transceiver for establishing a satellite communications link, as illustrated schematically in FIG. 11. Alternatively, the asset, object, people or animal monitor and the central station can each include a radio frequency (RF) transceiver for establishing an RF communications link. Still further, the asset, object, people or animal monitor and the central station can be directly connected, either electrically or optically, without departing from the spirit and scope of the present invention.

FIG. 12 depicts the many components of a preferred embodiment of the present invention and illustrates there interrelationship. Included are an asset, object, people or animal monitor 1114 of the present invention which includes a processor 1210 for controlling operations of the asset, object, people or animal monitor 1114 and, more particularly, for controlling the interface between the impulse radio receiver 1114a, the impulse radio transmitter 1132, the bar code scanning device 1154 and the wireless switch activating means 1152. The asset, object, people or animal monitor also contains the satellite communicator transceiver 1245 for position determination as well as the communication means 1250 for establishing communications between the operator interface 1240 and the asset, object, people or animal monitor 1114. Said communications means 1250 also establishes communication between the asset, object, people or animal monitor 1114 and the central station 1112.

Within the operators interface 1240 is a data entry device 1260, a communications means 1265 for communicating with the asset, object, people or animal monitor's communications means 1250, a display 1270, a memory 1275 and a controller 1280 for controlling the aforesaid.

Within said central station 1112 is a communication means 1285, a data entry device 1290, a display 1292 and a memory 1294. A controller 1296 controls the operation of the aforesaid. As articulated in greater detail infra, sensors 1126 are attached and interfaced with individual pieces of cargo 1134, and can be utilized to monitor any desired status and are interfaced via sensor interfaces 1140 to impulse radio transmitters 1132. Impulse radio transmitters 1132 transmit information about which transmitter (i.e., the transmitter 1132 serial number) is transmitting, followed by information received from sensors 1126 to the impulse radio receiver 1114a. The impulse radio receiver 1114a interfaces with processor 1210 which uses that information in combination with information received from the bar code scanning device 1154, to control the wireless switch activating means 1152 and the information related via communication means 1250 to the operators interface 1240 and the central station 1255.

The asset, object, people or animal monitor 1114 of one advantageous embodiment also frequently determines the location of the structure 1116, such as at predetermined time intervals. The asset, object, people or animal monitor 1114 of this embodiment can therefore also determine if it is time to update the location of the structure 1116 and, if so, can prompt the position determining means to update the position of the asset, object, people or animal monitor. The asset, object, people or animal monitor 1114 can thereafter transmit information which identifies the updated location to the central station 1112 or the asset, object, people or animal monitor 1114 can store the updated location until the central station 1112 subsequently requests an update of the location of the structure 1116, at which time the asset, object, people or animal monitor 1114 can provide the central station with the most recent location of the structure 1116. The central station 1112 can organize and prepare reports of varying levels of detail based upon the information received from each respective asset, object, people or animal monitor 1114 in order to assist or advise the owners of a fleet while the freight continues along its route. In addition, the central station can display the present and historical location of the respective structure 1116 as an overlay on a computer generated map to further assist the owners of the freight to monitor a particular structure and to assess route usage, asset deployment and other operational parameters of value and interest.

The central station 1112 can also process the received data and, in particular, the data relating to the actual conditions or events sensed by the on-board sensors to detect trends, such as refrigerated cargo which is gradually warming, and/or to detect sensed conditions which exceed or fall outside of acceptable limits. Based upon an evaluation of the received data, the central station can then advise the asset, object, people or animal monitor 1114 and, in turn, the operator of the tractor 1116b of potential or upcoming problems with the freight, such as by transmitting a warning message to the asset, object, people or animal monitor and, in turn, to the operator of the tractor. In addition, the data received by the central station 1112 which relates to the actual on-board conditions or events can serve as a log for insurance purposes so as to assist the owner of the freight in determining the party responsible and the reasons for any damage which their freight sustained.

The central station 1112 can also produce a variety of reports based upon the received data which are tailored or customized according to the unique business requirements of a particular customer. By more closely monitoring the remotely located structures 1116, and in particular the individual contents of each object within the structure, the central station can provide status reports which allow the owners of the structures to more efficiently utilize the structures, thereby increasing the overall system productivity.

While the controller 1296 and related memory devices 1294 of the central station 1112 can be organized in different manners without departing from the spirit and scope of the present invention, the controller of one embodiment is adapted to manage a large scale relational data base, thereby supporting a variety of tables that link fields containing data of interest to the dispatcher or the owners of the freight.

According to one advantageous aspect of the present invention, the asset, object, people or animal monitoring system 1110 also includes an operator interface 1240 for providing information to and receiving information from an operator. For example, the operator interface can be mounted within the cab of a tractor 1116b and can be adapted to communicate with the asset, object, people or animal monitor 1114 disposed within the trailer 1116a which is hitched or tethered to the tractor. In particular, the operator interface 1240 and the asset, object, people or animal monitor 1114 can each include local communications means, such an impulse radio systems, RF, IR or audio transceiver, for establishing a second communications link.

The operator interface 1240 can also include a controller 1280, such as one or more microcontrollers or microprocessors, for controlling the operations of the operator interface and for processing data received from the asset, object, people or animal monitor. Moreover, the operator interface can include a data entry device 1260, such as an optical scanner, an RF tag sensor and/or a keyboard, for allowing the operator to enter data. This operator-entered data can then be transmitted, via the second communications link 1162, to the asset, object, people or animal monitor 1114 for subsequent processing, storage and/or transmission, via the first communications link 1166, to the central station 1112. For example, the operator can enter and transmit data via the first and second communications links that identifies or otherwise relates to the cargo 1134 stowed within the structure 1116. Thus, the central station 1112 and/or the asset, object, people or animal monitor 1114 can monitor the status of the cargo and can pinpoint the times at which the cargo was loaded and delivered as well as the condition of each individual piece of cargo 1134. In addition, the operator can enter and transmit messages via the first and second communications links that alert the dispatcher and/or emergency service personnel of a situation, such as a traffic accident or a fire, which demands emergency assistance.

The data entry device 1260 of the operator interface 1240 can also include an emergency or panic button which, when depressed, transmits a signal to the central station advising the dispatcher of the need for emergency assistance. In addition to the communications means 1265, such as a transceiver, the operator interface can also include a display 1270 and one or more memory devices 1275 for displaying and storing data, respectively.

In addition to transmitting or passing information received from the operator interface 1240 to the central station 1112, the asset, object, people or animal monitor 1114 can provide the operator of the tractor 1116b with helpful information via the operator interface 1164. For example, the asset, object, people or animal monitor can provide a warning to the operator if the asset, object, people or animal monitor has received an interrupt from one or more of the individual cargo sensors 1136. If desired, this warning can also include a message that identifies the remedial action to be undertaken by the operator and can be on a individual cargo by cargo basis since each distinct piece of cargo 1134 is monitored individually. Since the present invention enables the monitoring of each individual cargo, a plurality of distinct cargo can each have separate remedial requirements.

The central station 1112 can also communicate with the operator of the tractor 1116b, via the communications links established by the asset, object, people or animal monitor 1114 and the operator interface 1240. For example, the central station can redirect the tractor-trailer by transmitting a message detailing the new route and the revised destination via the first communications link from the central station to the asset, object, people or animal monitor which, in turn, retransmits the message, via the second communications link, to the operator interface. In addition, the central station can periodically provide the operator interface with location data which identifies the present location of the trailer 1116a, such as by street location or by city and state.

Figure 13:
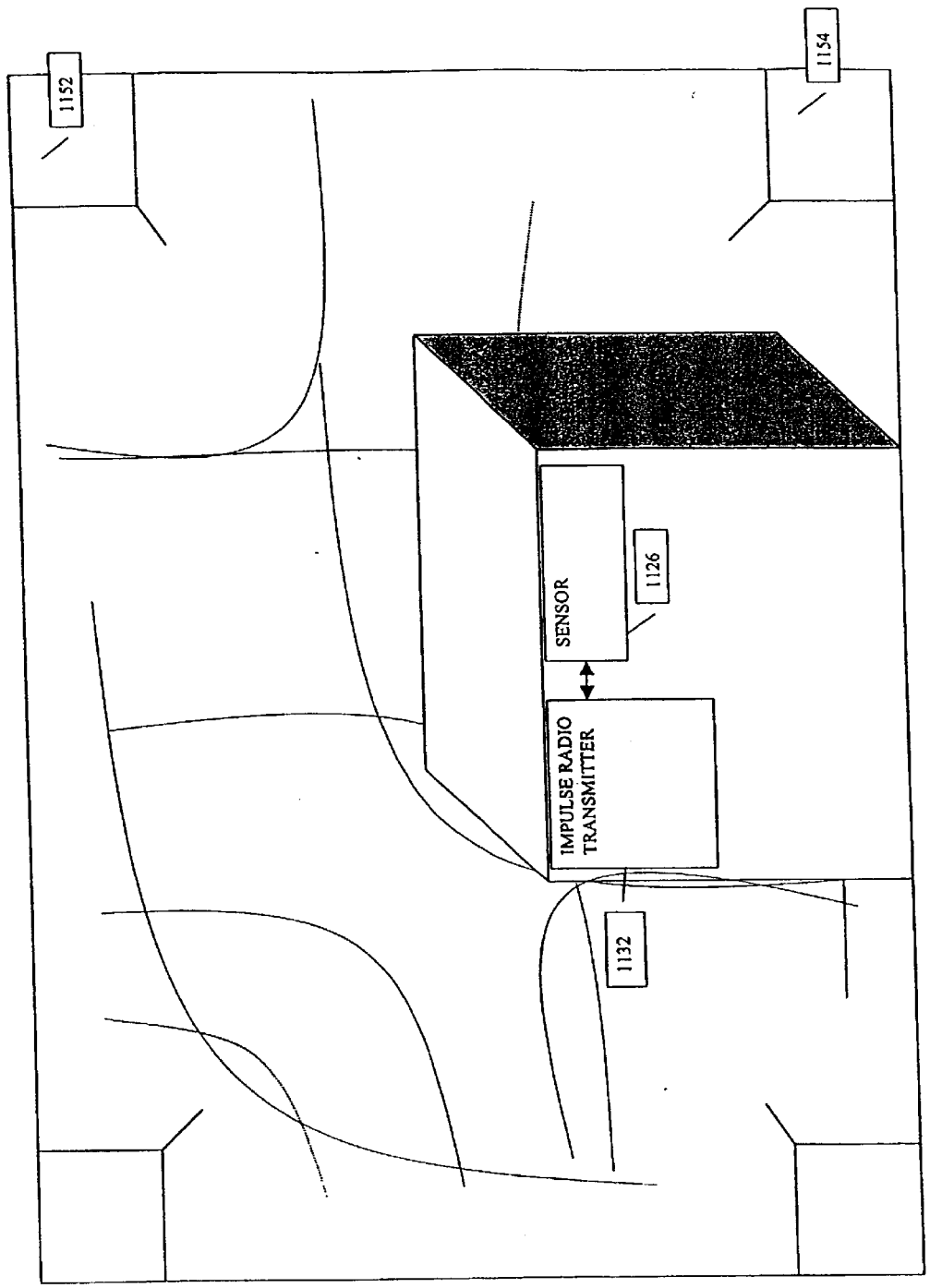
FIG. 13 is an enlargement of the entrance to a structure wherein assets, objects, people or animals will be stored and wherein said entrance contains a bar code scanning means and a wireless switch activator.

FIG. 13 elaborates on the entrance 1138 to the structure 1116a depicting one possible placement of bar code scanner 1154 and wireless switch activator 1152. The bar code scanner 1154 in this embodiment is affixed to the lower right hand portion of entrance 1138 to structure 1116a. The scanner 1154 can be permanently fixed to the interior wall or temporarily placed against the wall. The bar code scanner 1154 upon activation continuously scans the entrance perimeter 1138 to the structure 1116a and when a bar code 1150 on cargo 1134 and/or the bar code on sensor 1126 passes within perimeter 1138, the information is passed to asset, object, people or animal monitor 1114. Similarly, as the bar code 1650 attached to impulse radio transmitter 1132 passes within the entrance 1138 to structure 1116a, the bar code 1650 information about radio transmitter 1132 is communicated to asset, object, people or animal monitor 1114.

Figure 14:
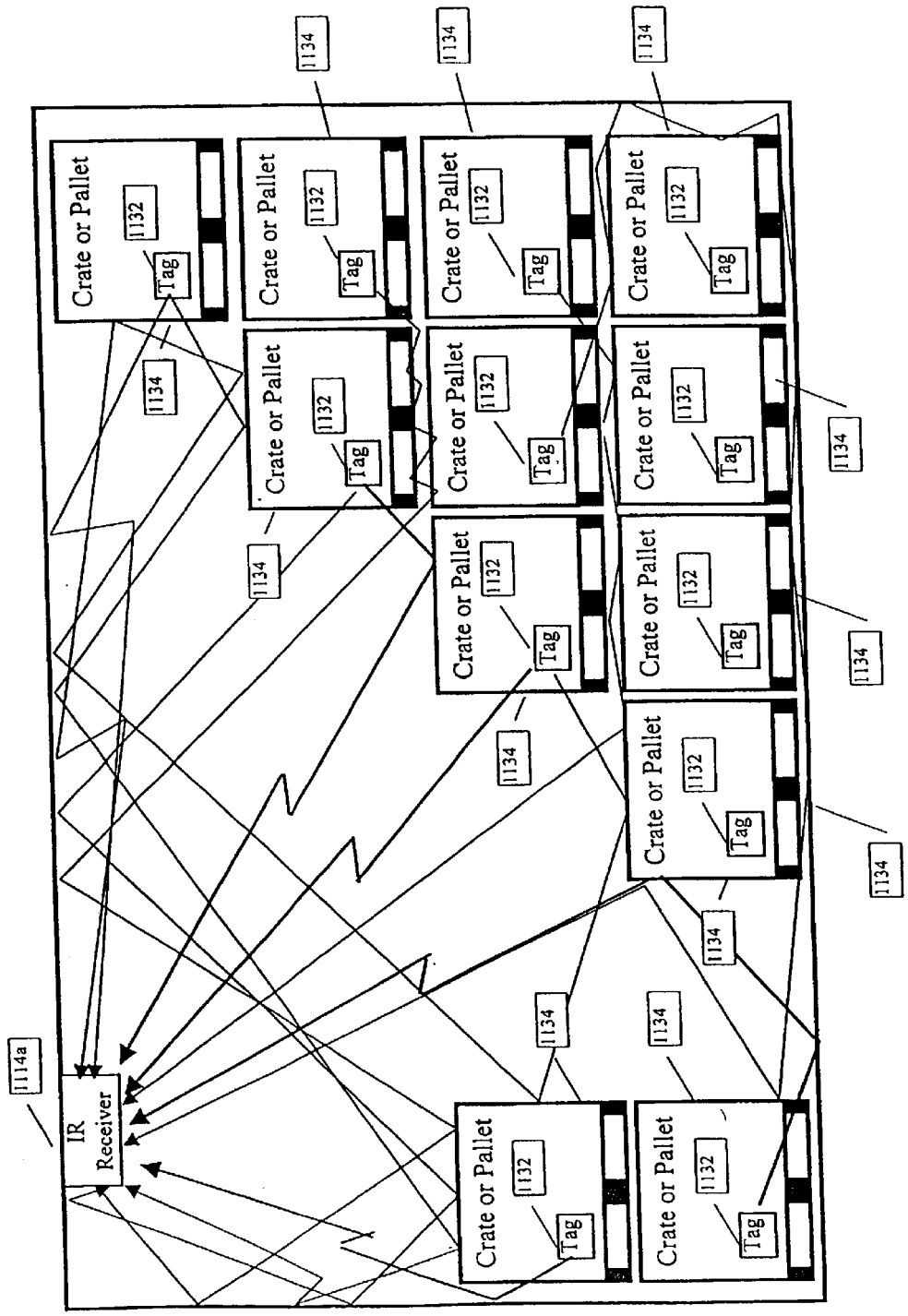
FIG. 14 is an enlargement of the structure from FIG. 1 illustrating the plurality of objects being monitored and the multipath environment characteristic of most structures in use today.

FIG. 14 more clearly depicts the multipath advantage of impulse radio technology. Multi-path is defined as the multiple routes taken by RF energy between the transmitter and the receiver. In the structure depicted in FIG. 14, when an transmission occurs it can "bounce" of the walls of the structure 1116a, the sides of other cargo 1134 or any other object. When standard radio transmitters transmit in an environment such as a structure, an immense multipath problem exits in that the signals can cancel each other out or create multipath error. Mutlipath error is defined as errors caused by the interference of a signal that has reached the receiver antenna by two or more different paths. Indeed, the larger the number of simultaneous transmissions, the more impossible for a standard radio receiver to receive intelligible information. Due to the unique properties of impulse radio communications, discussed in detail in the above referenced patents, this multipath problem is significantly reduced and can actually take advantage of the multipath effects to enhance the signal. Thus, the impulse radio allows for a large plurality of simultaneous transmissions and therefore the capability for monitoring individual pieces of cargo in a structure wrought with multipath difficulties.

Figure 15:
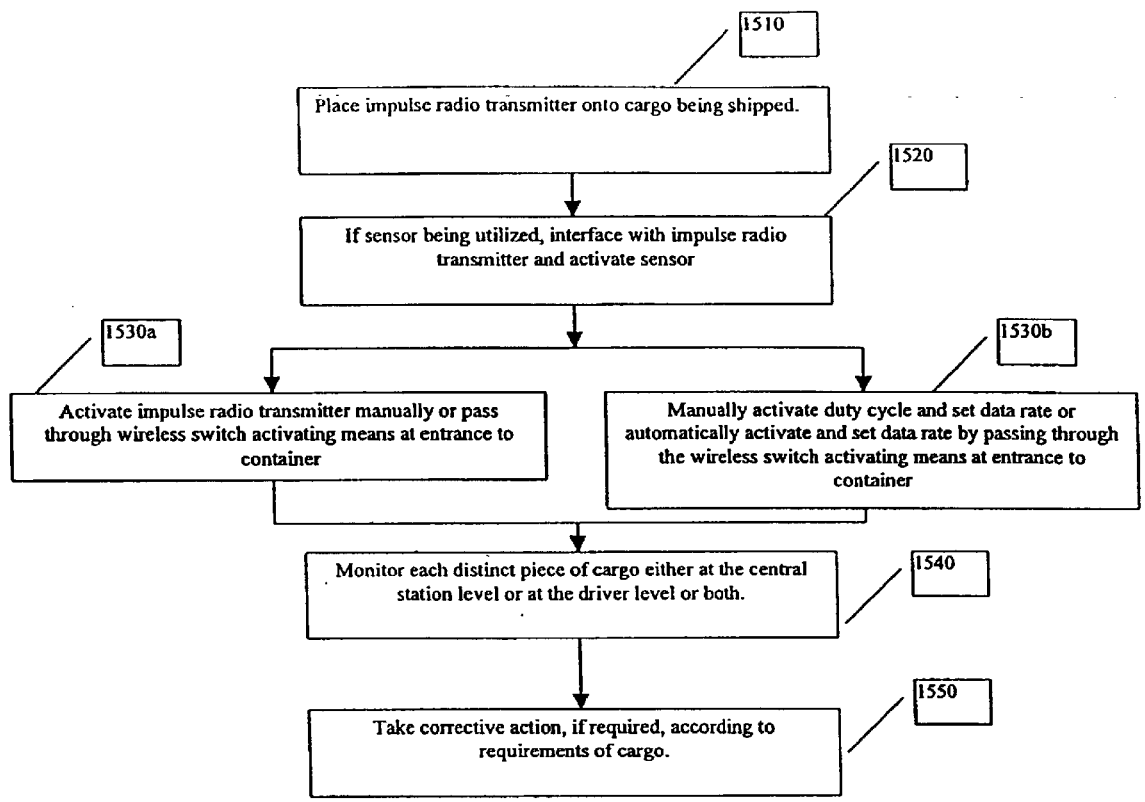
FIG. 15 illustrates the steps performed to activate and begin asset, object, people or animal monitoring by the impulse radio asset, object, people or animal monitor of one embodiment of the present invention, wherein the transmitter is activated and set to the desired pulse duty cycle by the individual placing the asset in the structure.

A concise flowchart of the method of asset monitoring is illustrated in FIG. 15. According to this method the first step at 1510 is to place the impulse radio transmitter 1132 onto cargo being shipped. If a sensor 1126 is being utilized, then it is activated and interfaced with the impulse radio transmitter 1132 at step 1520. In step 1530a, the impulse radio transmitter is either activated manually or by passing it through entrance 1138 to structure 1116a. In step 1530b, the duty cycle is also set for transmitter 1132 either manually or again by passing it through entrance 1138 to structure 1116a wherein the wireless switch activator 1152 sets the duty cycle. After the impulse radio transmitter 1132 has been attached, activated, set for the desired duty cycle and set for the desire data rate, it is monitored in step 1540. If in step 1540 a predetermined status has been exceeded, corrective action can be taken in step 1550.

FIG. 16 illustrates a possible impulse radio transmitter 1132 of a preferred embodiment of the present invention. There are numerous ways to attach the impulse radio transmitter 1132 to cargo 1134 within structure 1116a. Holes 1620 enable strap mounting to the cargo 1134. Also, an adhesive back 1610 enable using adhesive to attach the impulse radio transmitter 1132. Wireless switch activator receiving means 1640 enables the impulse radio transmitter 1132 to receive wireless signals from the wireless switch activator 1152, thereby enabling activation of the impulse radio transmitter 1132 and also setting its transmission duty cycle and transmission rate. Contacts 1650 can be used to interface with the sensors attached to the cargo 1134. As described above, bar code 1630 provides information concerning which transmitter 1132 is transmitting to the impulse radio receiver 1114a via the bar code scanning device 1154 and processor 1210. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

Hospital Patient and Equipment Monitoring

One such alternate embodiment contemplated is the use of the present invention to monitor the presence and status of a patient and equipment in a hospital. Because of the structure of most hospitals, multipath effects are very pronounced. Further, a wide range of parameters to monitor are present. For example, one patient one may want to monitor their blood pressure only and on another one may want to monitor their blood pressure, their EKG, their breathing, and many other medical parameters. Impulse radio is uniquely suited to this situation because of the low power of the transmitters, the ability to widely vary the duty cycle and transmission rate and the benefits of multipath enhancing rather than degrading the transmission signal. An impulse radio transmitter is interfaced with any desired medical monitoring equipment, which is monitoring a patient. Further, as described above, it transmits to an impulse radio receiver which is interfaced with a remote patient monitor that can be centrally located within a hospital. It is anticipated that the features described above (e.g., remote activating means and bar code scanning means) can be implemented in the present embodiment without undue experimentation.

Vending Machine Monitoring

Taking advantage of the characteristics of Impulse Radio, the present invention can also be used to monitor vending machines remotely located to a central monitoring system. For example, transmitters can be placed within soda machines to monitor the depletion of soda machines. Herein, a transmitter is interfaced with the empty warning system that is already in place. It is well known in the art to have "sold out" indications of when a particular item is no longer stocked in a machine. This is present in vending machines that dispense anything from sodas to diapers. When the "sold out" indication is present, the impulse radio transmitter is notified via the interface with the "sold out" indication and the impulse radio transmitter transmits this information to an impulse radio receiver which is interfaced with an remote monitor via any of the communications links described above. Also, the status of the vending machine can be monitored (e.g., the temperature of a ice cream machine or soda machine) to notify the remote monitor when maintenance is required. When the central monitor is notified of the empty condition, an order to refill can be initiated.

Prisoner Monitoring System

Prisoner monitoring is also one very important use of impulse radio in the embodiments described above. As with monitoring biohazardous material, people who are subject to incarceration need to be monitored. Due to the structure of prisons, with their steal walls and cells, standard radio transmission means are very unreliable. Due to the unique properties of Impulse radio technology, transmission within the interior of prisons is now possible and reliable. Further, because of the extremely low power requirements of impulse radio transmitters, depending on how often you want to check the status of the prison and thereby what you set the impulse radio transmitter duty cycle to, the batteries in the impulse radio transmitters may last many weeks. Presently, the standard way to check the presence of prisoners is by roll call or bed checks. With the present invention, a remote systems can constantly monitor the prisoners to ensure they are present. A prisoner has an impulse radio transmitter unremoveably attached to his person. The impulse radio transmitter periodically (e.g., every five minutes) sends transmissions to an impulse radio receiver interfaced with a prisoner monitor centrally located. If the impulse radio transmitter is forcibly removed it immediately transmits a notification to the prisoner monitor.

In an environment where there may be hundreds or thousands of prisoners, it would have been impossible previously for each prisoner to have their own transmitter which transmits every few minutes because it would have been impossible for a receiver to receive the signals because of the great interference that would have been cause by all the simultaneous transmission in a closed environment. These interference problems are greatly ameliorated by the present invention and enables the prisoner monitoring system of the present invention.

Home Confinement Monitoring System

Due to the overcrowding of prisons, the courts have recently been requiring home imprisonment. In this situation, a convict is required not to leave their home. They are monitored by radio transmitters attached to the "home prisoners" which are then monitored by a central monitoring station B usually a sheriff's office. However, problems have arisen because with standard radio transmissions there are "dead zones" within most houses causing false alarms. With the present invention these "dead zones" would be greatly diminished and the home prison system greatly enhanced. In the impulse radio embodiment of home prisoner monitoring systems, an impulse radio transmitter would be unremovabely attached to the home prisoner and if they move outside of the range of the transmitter (i.e., the leave the house), no transmission will be received by the impulse radio receiver and then an alarm will be given by the remote home prisoner monitor.

Animal Monitoring System

It is within the anticipated scope of the present invention to monitor the status and presence of animals in a stock yard or on a farm by the similar methodologies discussed above. In this embodiment a plurality of animals can be monitored for presence as well as condition. For example, if it is desired to make sure that no animals have wandered off as well as determine conditions such as temperature or heart rate of an animal, this can be accomplished by placing an impulse radio transmitter in communication with a sensor on the animal and have an impulse radio receiver receive said transmissions and interface with an animal monitor remotely located.

Utility Monitoring System

Another possible embodiment of the present invention using impulse radio technology is for remote monitoring of utility meters. Currently, most meters are read by individuals manually reading the meters and recording them. This is a very laborious process and is costly and time consuming. In the present embodiment, an impulse radio transmitter is interfaced with a utility meter and thereafter transmits the current meter reading at predetermined intervals. Because of the low power requirements of the impulse radio transmitters and the low duty cycle and low data rate required for transmitting the information, the battery for powering the impulse radio transmitter can last many months or more. Also, since multipath effects are not as pronounced with impulse radio technology, the transmission will be far more reliable than standard wireless transmissions. Due to range limitations, the impulse radio receiver may be positioned within several hundred meters of the impulse radio transmitter and thereafter connected via any of the methods discussed above for transmission of the information to a remote site.

Impulse Radio Toll Booth System

There has been a great amount of research to end long delays that occur at toll booths. Much innovation has occurred in this area and it is now possible for a driver to place a "toll tag" in there automobile and pass through the toll booth without coming to a complete stop and wherein information is passed concerning the car. The information concerning which car has which tag was previously registered in a database which enables subsequent billing. However, there has been a number of errors generated because of the nature of automobiles and tunnels and bridges. These environments create immense mutlipath problems. For example, if a car follows closely behind a large truck many times the system will not "pick up" the "toll tag" in the car. The driver then many times must come to a complete stop and actually place the toll tag near the scanner. With impulse radio technology, these multipath problems are overcome and a far more efficient system is developed. In the present embodiment, a driver is given a particular impulse radio transmitter, when the driver approaches the toll booth he manually activates the impulse radio transmitter. The transmission contains a serial number that has been registered with the toll booth authorities so that a bill can be generated. An impulse radio receiver is located at the toll booth and receives the information from the impulse radio transmitter and communicates the information to a controller with a storage device for recording the serial number of the tag and thereby determines which vehicle has passed and therefore which vehicle to bill for the transit.

Multipath Advantage

Multipath in a container is severe. Rayleigh fading conditions prevail.

Decay times may be hundreds of nanoseconds. Reflections may be in the hundreds. Direct path may be obscured by other stacked assets, boxes, containers. Propagation conditions approach Rayleigh conditions. Severe Rayleigh nulls prevent good coverage. Transmit power must be increased to minimize the effect of nulls. Spread spectrum techniques or diversity receivers may be used to overcome these effects, but these approaches add complexity to the receiver.

Impulse radio offers advantages in a multipath environment. Impulse radio offers low cost spectrum spreading.

Figure 17A:
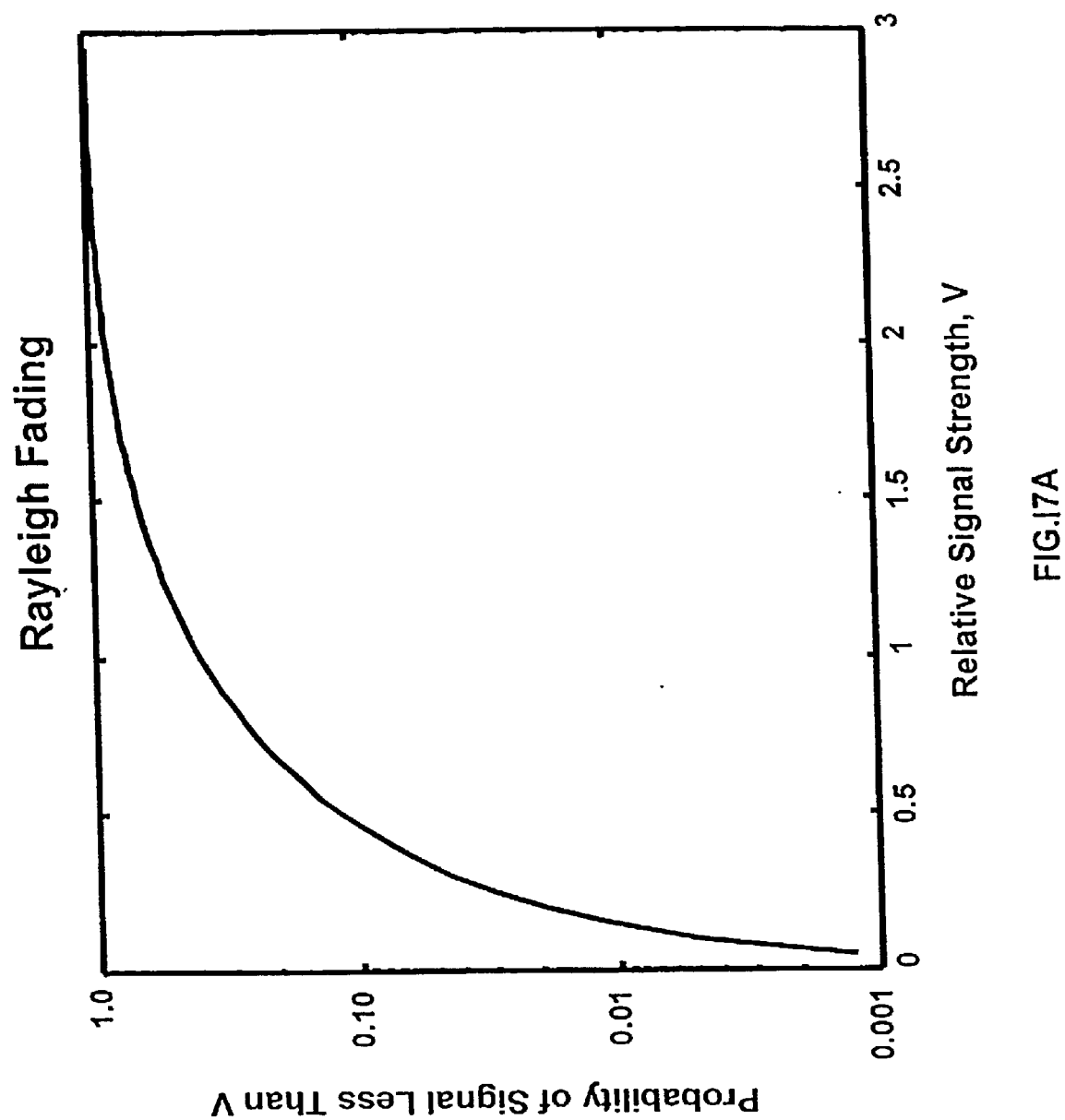

In the frequency domain, multipath reflections have an envelope that follows a Rayleigh distribution as in FIGS. 17A and 17B. It can be seen that a 90% coverage represents 16 dB attenuation. This suggests that 16 db additional power is needed to cover to 90%. Likewise 99% requires 26 dB excess power.

Figure 17C:
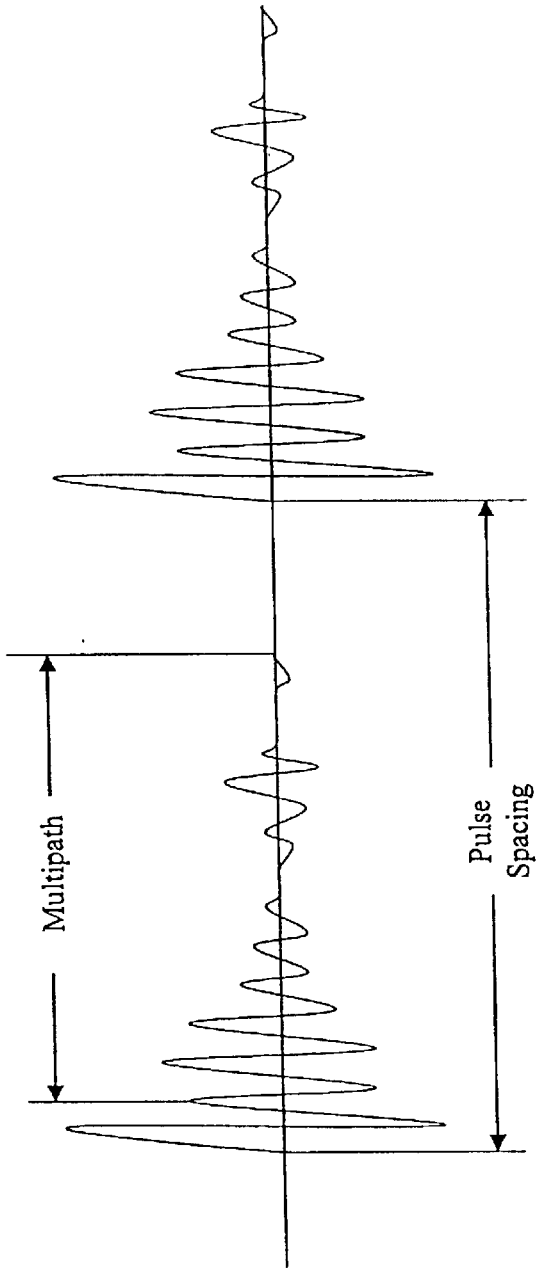
Figure 17F:
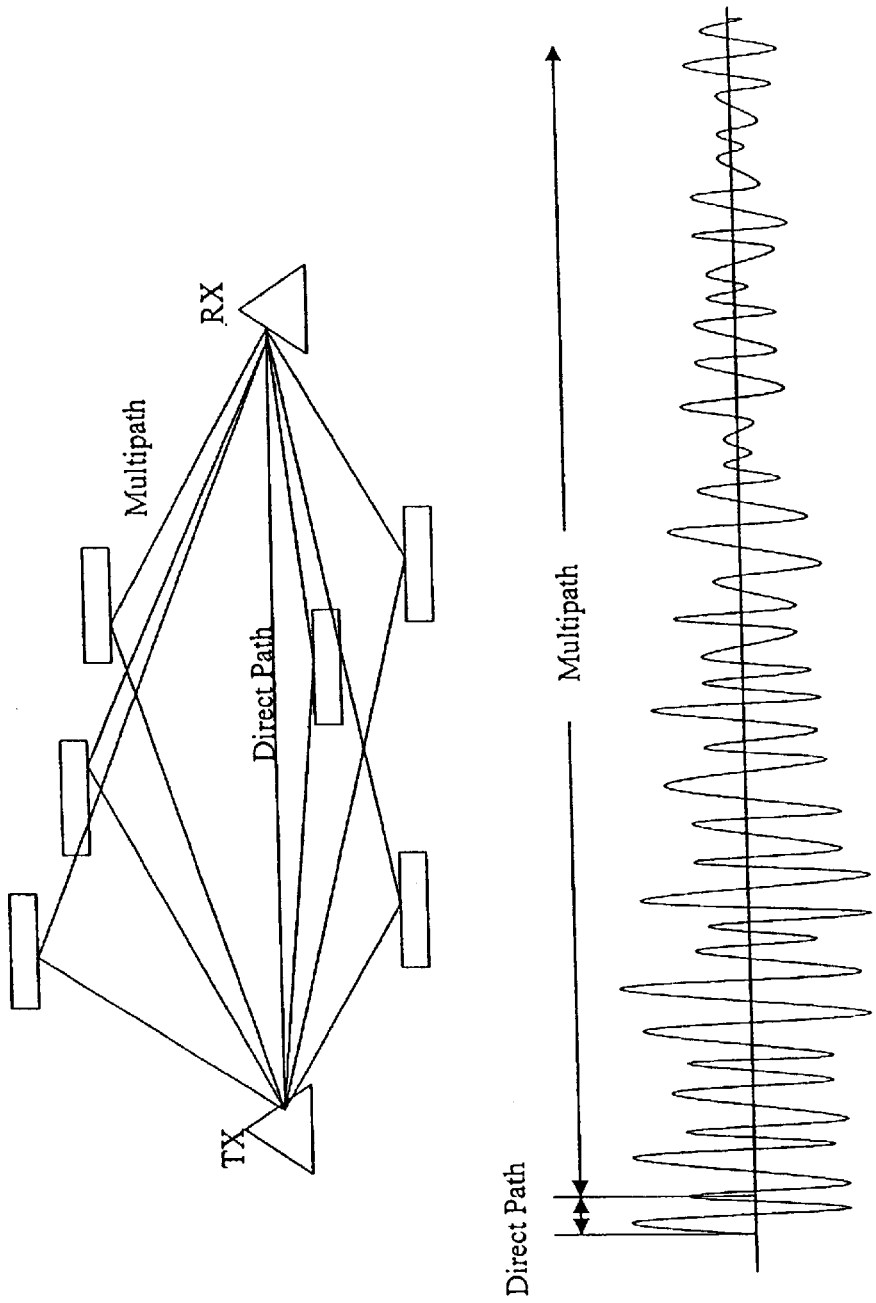

Using an impulse transmitter and synchronous receiver, such as a synchronously triggered scope, a map of the impulse response of a channel may be made as shown in FIGS. 17D–17F.

Multipath Distance Algorithm

Lock on the signal at any point. Multipath may be stronger than the direct path signal, thus the first lock on the strongest signal, or first found signal may not be the direct path.

Set the timer to an earlier time and test for signal. Return to the first lock point to maintain lock if necessary. Keep backing up until no signal is found.

Alternatively, one may back up a predetermined distance (10 ns) and then search forward slowly, using maximum integration gain to find any weak remnant of the direct path signal.

The backup and search is then repeated until no signal is found. This finds the earliest signal, which is the most direct path available.

In a rake receiver, with two or more correlators, or a receiver that can multiplex a correlator between at least two time delays, the receiver can stay locked to a given first lock point and search with arbitrary integration gain on any other time delay because there will be no drift due to oscillator instability. (In the case of mobile units, Doppler drift must still be considered).

Impulse Radio Duty Cycle Variation and Synchronization Techniques

Figure 18:
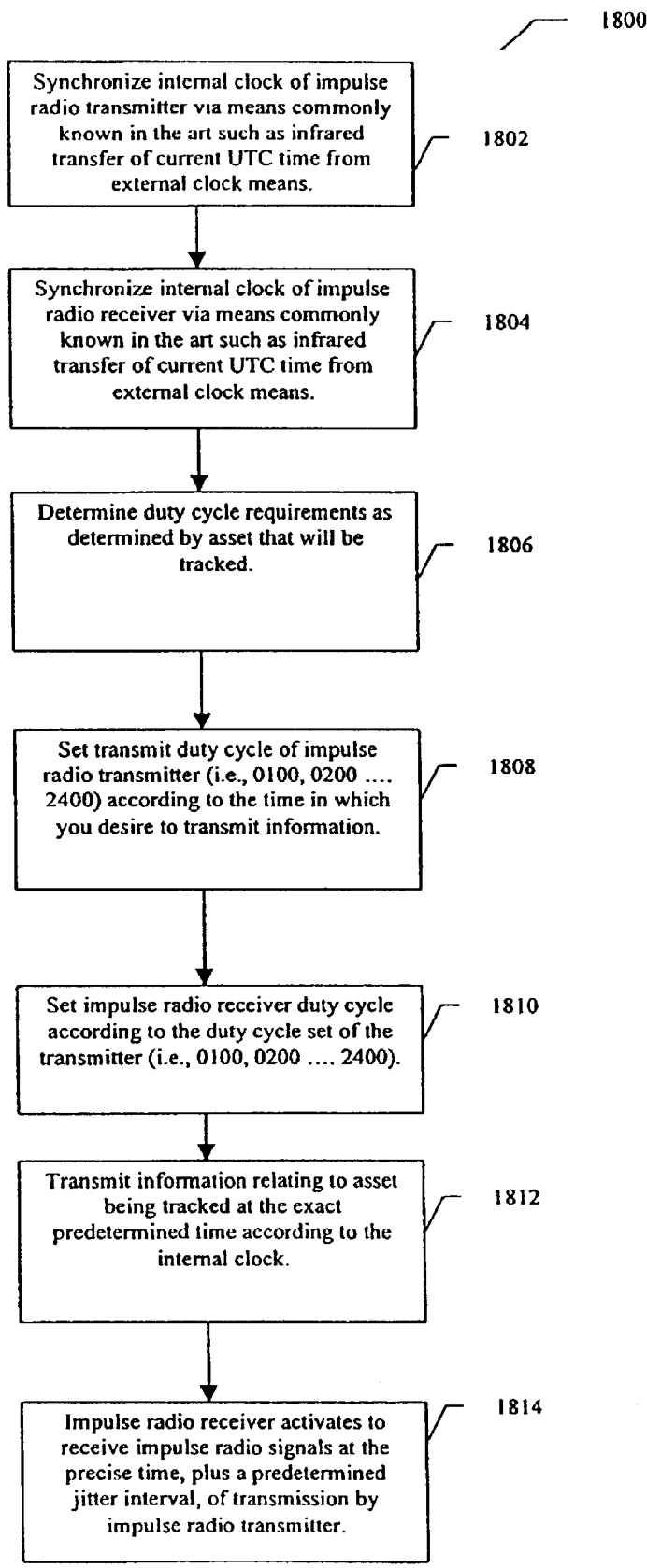
FIG. 18 is a flowchart of a for method of varying the duty cycle of impulse radio transmissions of the present invention.

As mentioned above, the ability to vary the duty cycle is very important. If the duty cycle can be varied based on varying circumstances a significantly more versatile system can be implemented. One such method of varying the duty cycle is illustrated in the flow chart of FIG. 18. At 1800 a flow chart of setting the duty cycle of the impulse radio transmitter and synchronizing the impulse radio receiver is depicted. At 1802 the impulse radio transmitter is set to a given time that will also be set into the impulse radio receiver. Although any time setting will work as long as the impulse radio receiver and impulse radio transmitter are consistent, it is depicted that the impulse radio receiver is set to the current UTC time. Again, it could be set to local time, a countdown timer or any other temporal means so long as the impulse radio receiver is set to the same timing methodology. Setting the internal impulse radio clock can be accomplished by many means known to those of ordinary skill in the art. A wireless setting of the clock can be accomplished by using RF energy to transmit time information to a RF receiver which internally sets the clock according to, for example, UTC time. The same device can be used to set the impulse radio receiver. In one embodiment, the impulse radio transmitter and impulse radio receiver are both within a predetermined range of the clock setting means and thereby are set simultaneously to a synchronous time. For example, both could be in the same warehouse or shipping container and a wireless activating means can activate them both while simultaneously setting there clocks and duty cycles.

In a separate embodiment, activation of the impulse radio transmitter and receiver internal clock setting means is accomplished by an individual, for example, loading the cargo. This internal clock setting means could receive signals which broadcast time information signals from the U.S. Bureau of Standards. Again, it is understood that any clock setting means can be used and the above are for exemplification only.

Upon setting the impulse radio transmitter in 1802 and the impulse radio receiver 1804, a determination is made of the duty cycle requirements in 1806. As mentioned above, the duty cycle may be for plutonium and for a short trip in which the duty cycle would be very short. For example, the clock of the impulse radio transmitter and receiver may be set upon loading into a transportation means to every 5 minutes and the current UTC time is 1700. In this case the impulse radio transmitter would be set to transmit at 1705, 1710, 1715 . . . and the impulse radio receiver having been set to the same internal clock would expect to receive signals from the impulse radio transmitter at 1705, 1710, 17015 . . . .

In order to ensure that effects caused by jitter of the transmitter or small clock inaccuracies, the impulse radio receiver will typically activate for a predetermined interval surrounding the impulse radio transmitter time. For example, if the transmitter is set to transmit at 1705, the receiver can activate to receive transmitted signals at the interval 1704.999 to 1705.001. In step 1812, the impulse radio transmitter transmits information relating to the object being tracked (e.g., plutonium) and in step 1814 the impulse radio receiver activates during the given time interval, which takes into account any jitter and clock inaccuracies, to receive the transmitted information. The information is related according to the methodologies articulated above.

Figure 19:
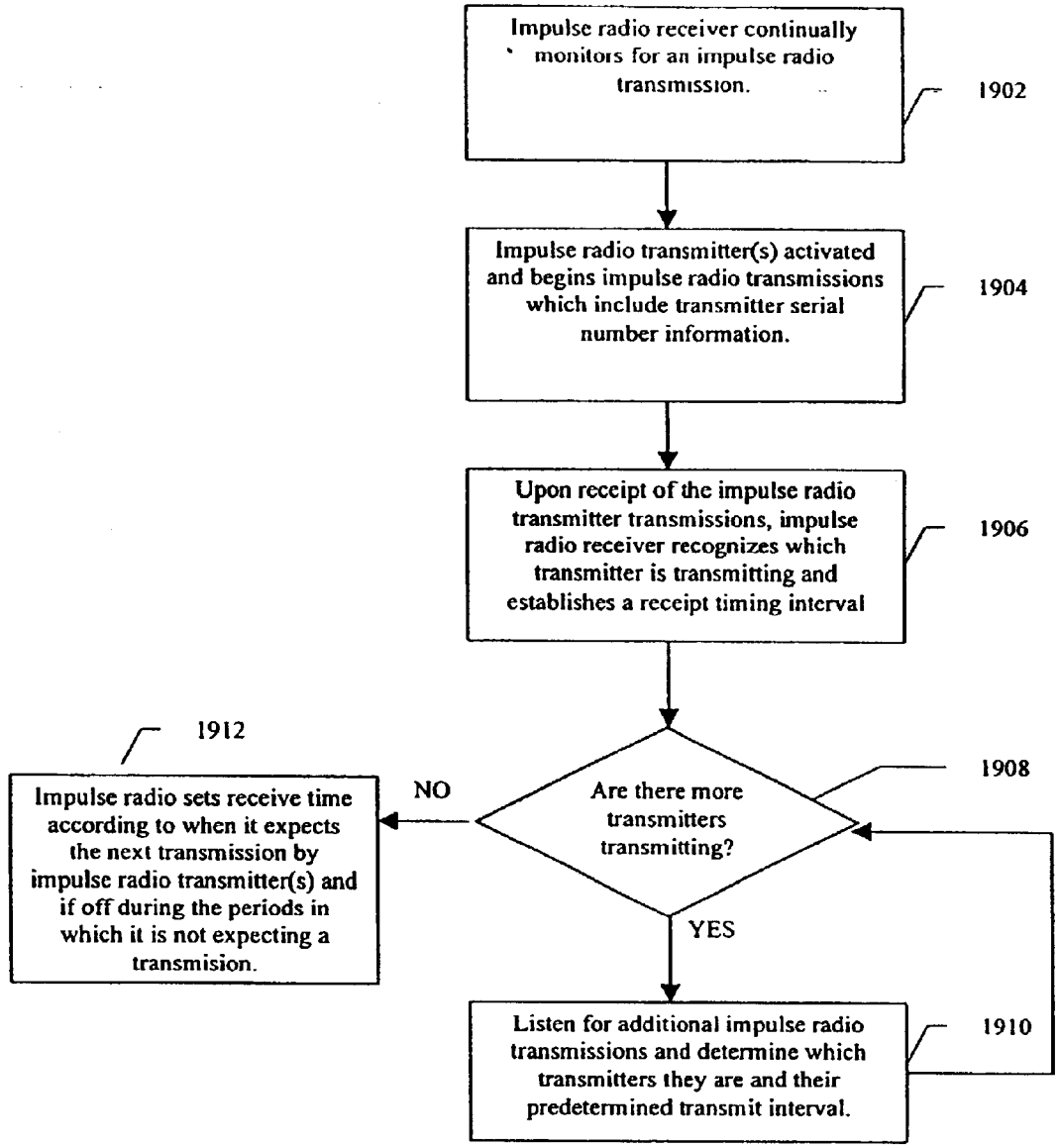
FIG. 19 describes another method of varying the duty cycles and completing impulse radio transmitter and receiver synchronization of the present invention.

FIG. 19 describes another method of varying the duty cycles and completing impulse radio transmitter and receiver synchronization. This method requires the impulse radio receiver to be waiting for the first impulse radio transmitter transmission 1902. The impulse radio transmitter begins transmitting by any of the aforementioned methodologies 1904. Upon receipt of the first impulse radio transmission 1906, which contains information about which transmitter is transmitting, the impulse radio receiver is programmed to know the duty cycle of that particular transmitter and when to expect the next transmission. For example, the impulse radio receiver will continuously monitor for the first impulse radio transmission and upon receipt will know that impulse radio transmitter number 1255584us298 is designated to transmit every hour and thereafter will only listen exactly one hour from the time of first transmission.

In step, 1908 a determination is made as to whether additional transmitters are transmitting. In step 1910 the impulse radio receiver receives additional impulse radio transmissions, then returns to step 1908 for a determination as to whether or not further transmissions will be made. This can be accomplished by predetermined wait periods, wherein after a given period if no transmissions are received, the impulse radio receiver will not wait for additional transmissions. Or it can be accomplished by expecting a certain number of transmissions and upon receipt of that number of transmissions, the receiver will go into its periodic mode. Additional methods are easily implemented without undue experimentation to those of ordinary skill in the art. In step 1912, after all transmitters have "checked in" thereby setting their predetermined interval, the impulse radio receiver only activates during the period in which it expects to receive transmissions.

Figure 20:
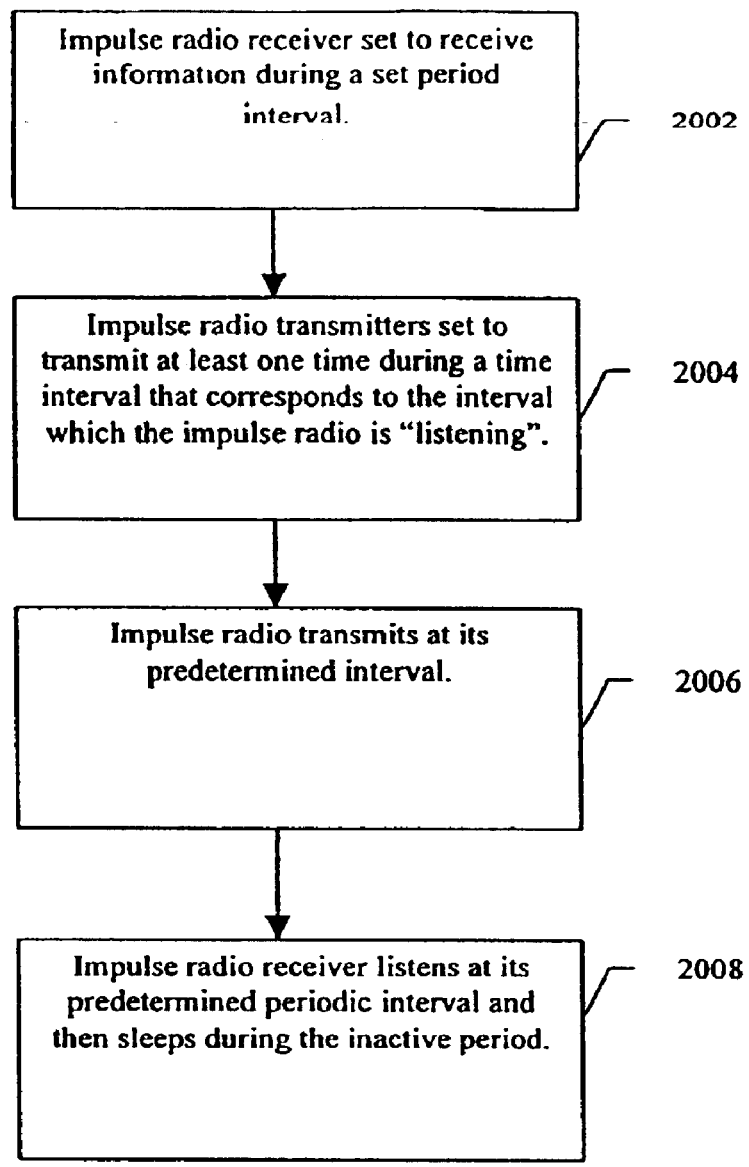
FIG. 20 is a flowchart illustrating a further implementation of duty cycle variation and synchronization techniques of the present invention.

FIG. 20 is a flowchart illustrating a further implementation of duty cycle variation and synchronization techniques. In this implementation, the receiver "listens" during a predetermined interval as in step 2002. "Listens" as used herein means that the impulse radio receiver activates and receives impulse radio transmissions according to the aforementioned impulse radio reception techniques as well as techniques described in the patents incorporated herein by reference. In step 2004, the impulse radio transmitters are set to transmit during an interval which corresponds with the period in which the impulse radio receiver will be listening. For example, the impulse radio receiver can be set to listen for exactly three minutes in a given sixty minute interval. The transmitters will then transmit at least once every three minutes for a short duration (e.g., ⅒ second). In this manner, it will be ensured that all transmissions will be heard while only requiring the impulse radio receiver to be listening and thereby using power for 3 minutes during a one hour period and will only require the impulse radio transmitters to transmit for a brief period every three minutes.

Thus, in step 2006 impulse radio transmits at its predetermined interval and at step 2008, the impulse radio receiver listens at its predetermined periodic interval and is powered off during the inactive period. It is understood that any interval can be used so long as the impulse radio transmitters transmit at least once every period corresponding to the listen period of the impulse radio receiver.

A unique advantage of impulse radio as used in the above embodiments is the ability to transmit nearly simultaneously. In a traditional non-impulse radio transmission, if simultaneous transmissions occurred there would be a very good chance of interference or reception difficulties (i.e., they would "step" on each other). For the reasons articulated above, this is not a problem with impulse radios. Further, to enhance flexibility a number of distinct embodiments of impulse radios can be used. As described above, each impulse radio receiver can have more than one correlator for receiving simultaneous transmission and also each transmitter can use its own pseudorandom code for channelization enhancement.

Conclusion

The present invention can be implemented using the various impulse radio techniques disclosed in the above-referenced impulse radio patent documents, which are incorporated herein by reference. Additionally, other impulse radio techniques, such as subcarrier modulation disclosed in above-referenced U.S. Pat. No. 5,677,927 for example, can be used together with the present invention.

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A monitoring system comprising:
   a sensor capable of monitoring a value of a parameter related to one of an asset, an object, a person, or an animal; and
   an ultra wideband impulse radio capable of interfacing with said sensor and further capable of periodically transmitting impulse radio signals conveying information related to said parameter during transmission intervals that are spaced apart in accordance with a predetermined duty cycle.

2. The monitoring system of claim 1, further comprising a second ultra wideband impulse radio capable of receiving at least one of said impulse radio signals during one of said transmission intervals by locking onto said at least one of said impulse radio signals during one of said transmission intervals.

3. The monitoring system of claim 2, further comprising a control station that includes a display capable of displaying at least a portion of said received information.

4. The monitoring system of claim 2, further comprising a control station that includes a storage device capable of storing at least a portion of said received information.

5. The monitoring system of claim 2, further comprising a control station that includes a processor capable of processing at least a portion of said received information.

6. The monitoring system of claim 2, further comprising a control station that includes a warning system capable of initiating an alarm when a condition of said parameter within said received information falls outside of an acceptable range.

7. The monitoring system of claim 6, wherein said warning system includes a communications link with an emergency services dispatcher.

8. The monitoring system of claim 7, wherein said emergency services dispatcher is a 911 dispatcher.

9. The monitoring system of claim 1, wherein said object is a structure and said parameter relates to pressure, temperature, humidity, volume or radioactivity of one content within the structure.

10. A method for monitoring sensor information, said method comprising the steps of:
    interfacing an ultra wideband impulse radio to a sensor;
    monitoring a value of a parameter related to one of an asset, an object, a person, or an animal using said sensor; and
    using said ultra wideband impulse radio to periodically transmit impulse radio signals containing information related to said parameter during transmission intervals that are spaced apart in accordance with a predetermined duty cycle.

11. The method of claim 10, further comprising the step of using a second ultra wideband impulse radio to receive at least one of said impulse radio signals during one of said transmission intervals by locking onto said at least one of said impulse radio signals during one of said transmission intervals.

12. The method of claim 11, further comprising the steps of processing, storing and displaying at least a portion of said received information.

13. The method of claim 11, further comprising the step of initiating an alarm when a condition of said parameter within said received information falls outside of an acceptable range.

14. The method of claim 11, further comprising the step of establishing a communication link with an emergency services dispatcher when a condition of said received information falls outside of an acceptable range.

15. The method of claim 10, wherein said object is a structure and said parameter relates to pressure, temperature, humidity, volume or radioactivity of one content within the structure.

16. A monitoring system comprising:
    a sensor capable of monitoring a value of a parameter related to one of an asset, an object, a person, or an animal;
    a first ultra wideband impulse radio capable of interfacing with said sensor and further capable of periodically transmitting impulse radio signals conveying information related to said parameter during transmission intervals that are spaced apart in accordance with a predetermined duty cycle; and
    a control station including:
        a second ultra wideband impulse radio capable of receiving at least one of said impulse radio signals during one of said transmission intervals by locking onto said at least one of said impulse radio signals during one of said transmission intervals;
        a processor capable of processing at least a portion of said received information;
        a storage device capable of storing at least a portion of said received information; and
        a display capable of displaying at least a portion of said received information.

17. The monitoring system of claim 16, wherein said control station includes a warning system capable of initiating an alarm when a condition of said received information falls outside of an acceptable range.

18. The monitoring system of claim 16, wherein said object is a structure and said parameter relates to pressure, temperature, humidity, volume or radioactivity of one content within the structure.

* * * * *